United States Patent
Yannone et al.

[11] 3,913,314
[45] Oct. 21, 1975

[54] SYSTEM AND METHOD FOR OPERATING A GAS TURBINE ELECTRIC POWER PLANT WITH BYPASS FLOW FUELING OPERATION TO PROVIDE IMPROVED RELIABILITY AND EXTENDED APPARATUS LIFE

[75] Inventors: Robert A. Yannone, Aldan; James J. Shields, Philadelphia, both of Pa.

[73] Assignee: Westinghouse Electric Corporation, Pittsburgh, Pa.

[22] Filed: June 9, 1972

[21] Appl. No.: 261,192

[52] U.S. Cl. ......... 60/39.14; 60/39.74 R; 60/39.27; 60/39.28 R
[51] Int. Cl.² .......................................... F02C 7/26
[58] Field of Search ......... 60/39.14, 39.28 R, 39.03

[56] References Cited
UNITED STATES PATENTS

| | | | |
|---|---|---|---|
| 3,279,169 | 10/1966 | Bayard | 60/39.14 |
| 3,282,323 | 11/1966 | Katz | 60/39.14 |
| 3,390,522 | 7/1968 | Whitehead | 60/39.14 |
| 3,593,736 | 7/1971 | White | 60/39.14 |
| 3,696,612 | 10/1972 | Berman | 60/39.14 |
| 3,759,037 | 9/1973 | Kiscaden | 60/39.14 |

*Primary Examiner*—Clarence R. Gordon
*Attorney, Agent, or Firm*—S. A. Seinberg

[57] ABSTRACT

A gas turbine electric power plant is provided with an industrial gas turbine which is operated by a computer control system. The gas turbine is provided with a liquid fuel system having a turbine driven pump which supplies fuel to turbine nozzles through a throttle valve. A bypass pump pressure regulator valve and a bypass pressure temperature limiter valve function together to provide stable fuel pressure operation and stable turbine inlet air temperature operation during ignition and other turbine operating periods. Such bypass means are operated substantially independently of the control system.

34 Claims, 19 Drawing Figures

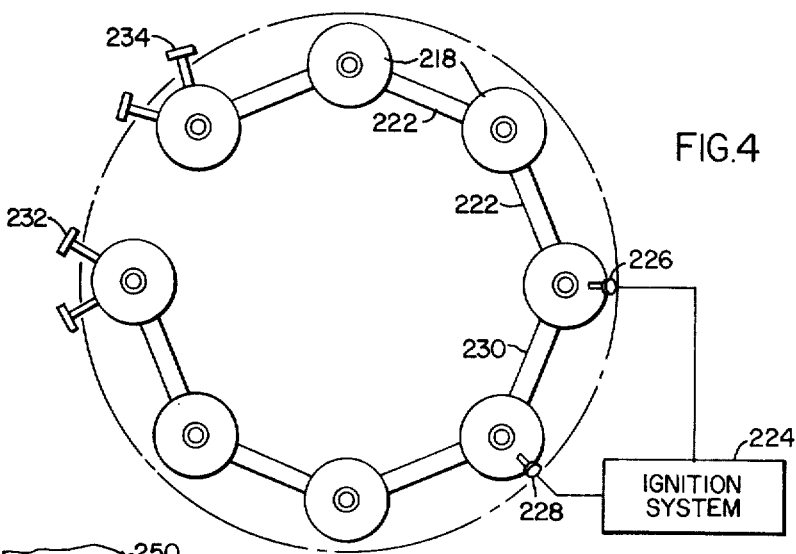
FIG.4
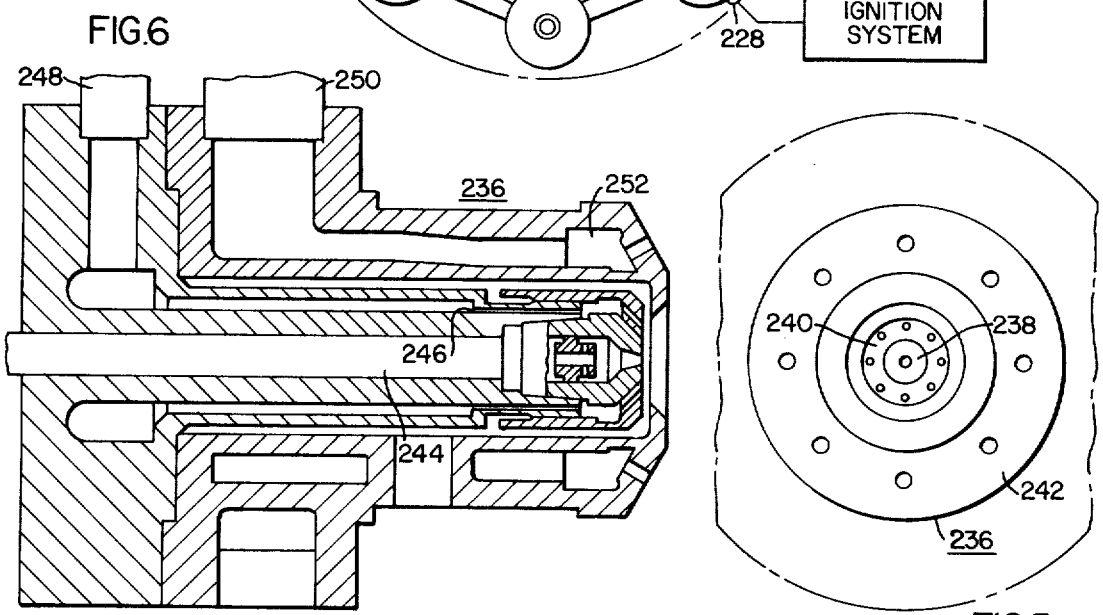
FIG.6
FIG.5
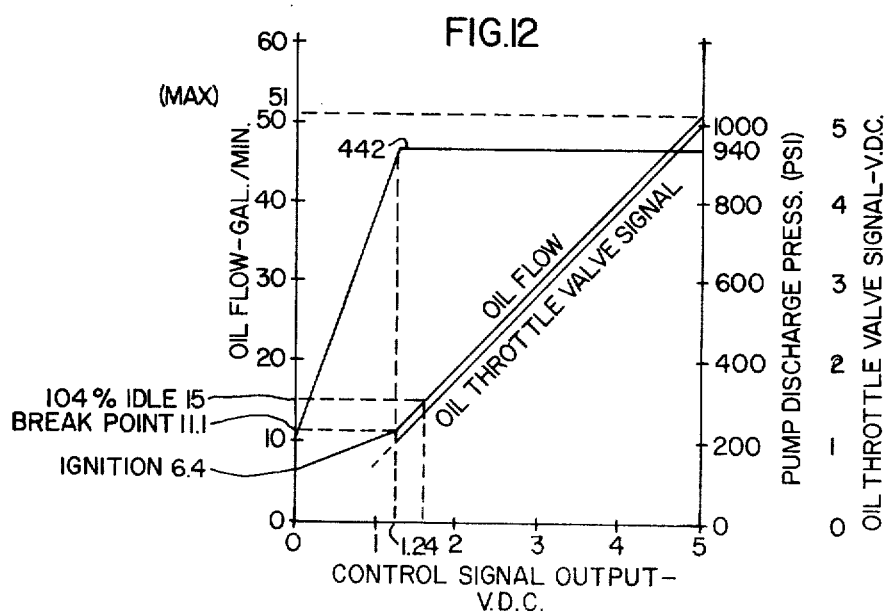
FIG.12

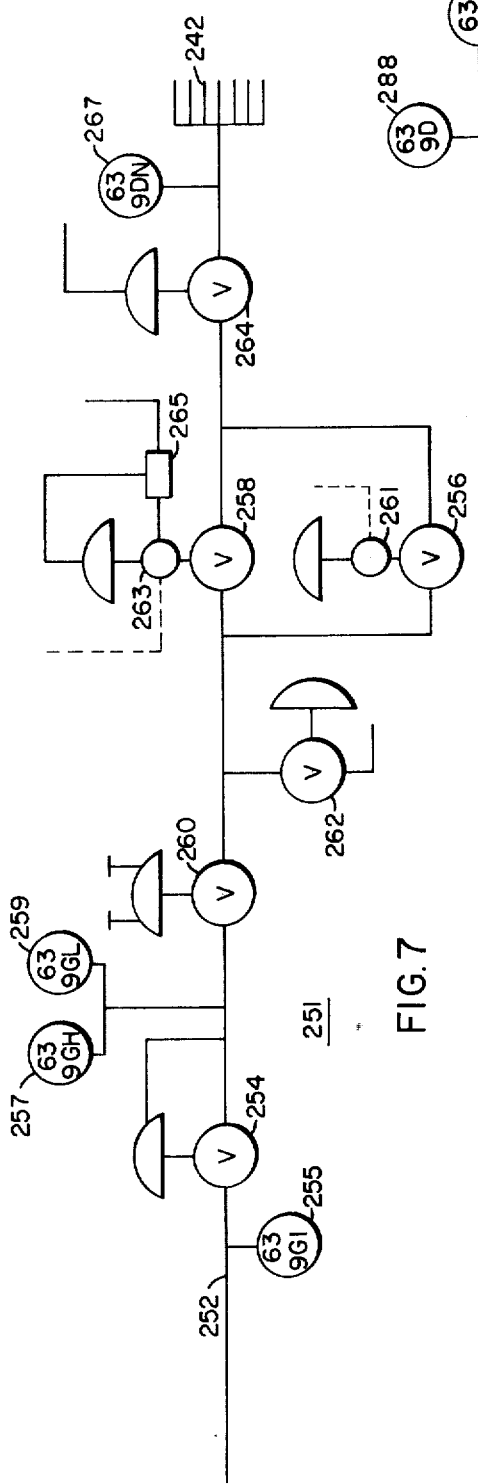
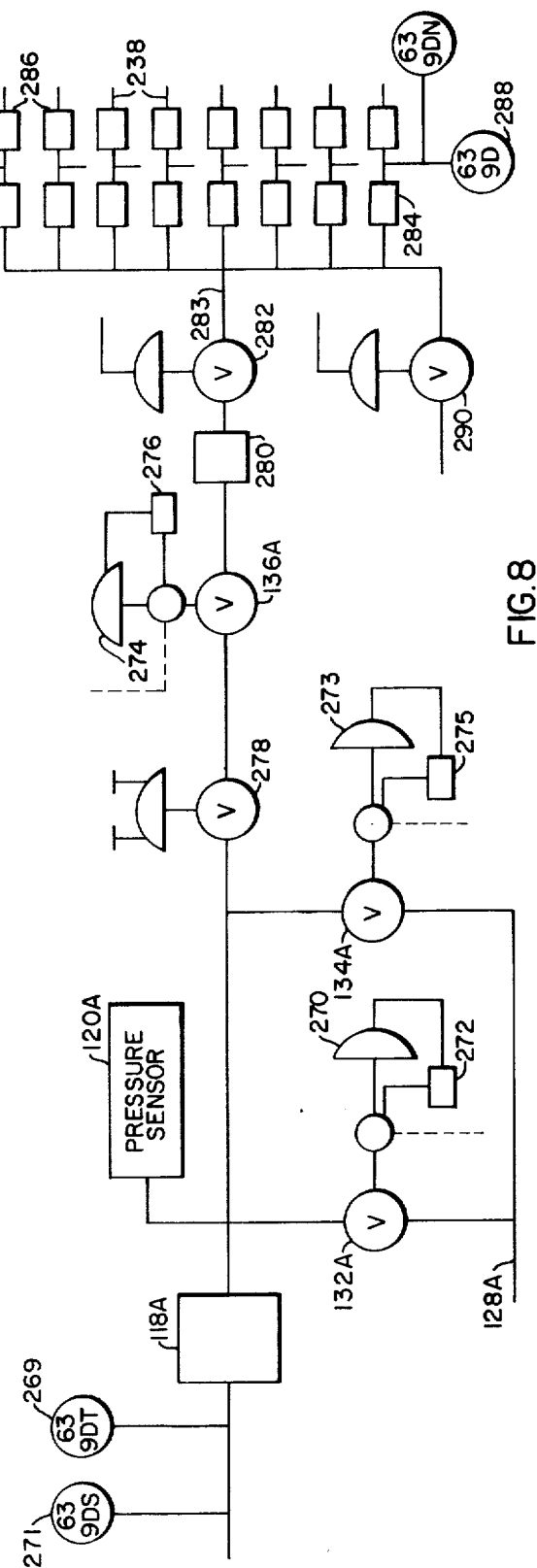
FIG. 7
FIG. 8

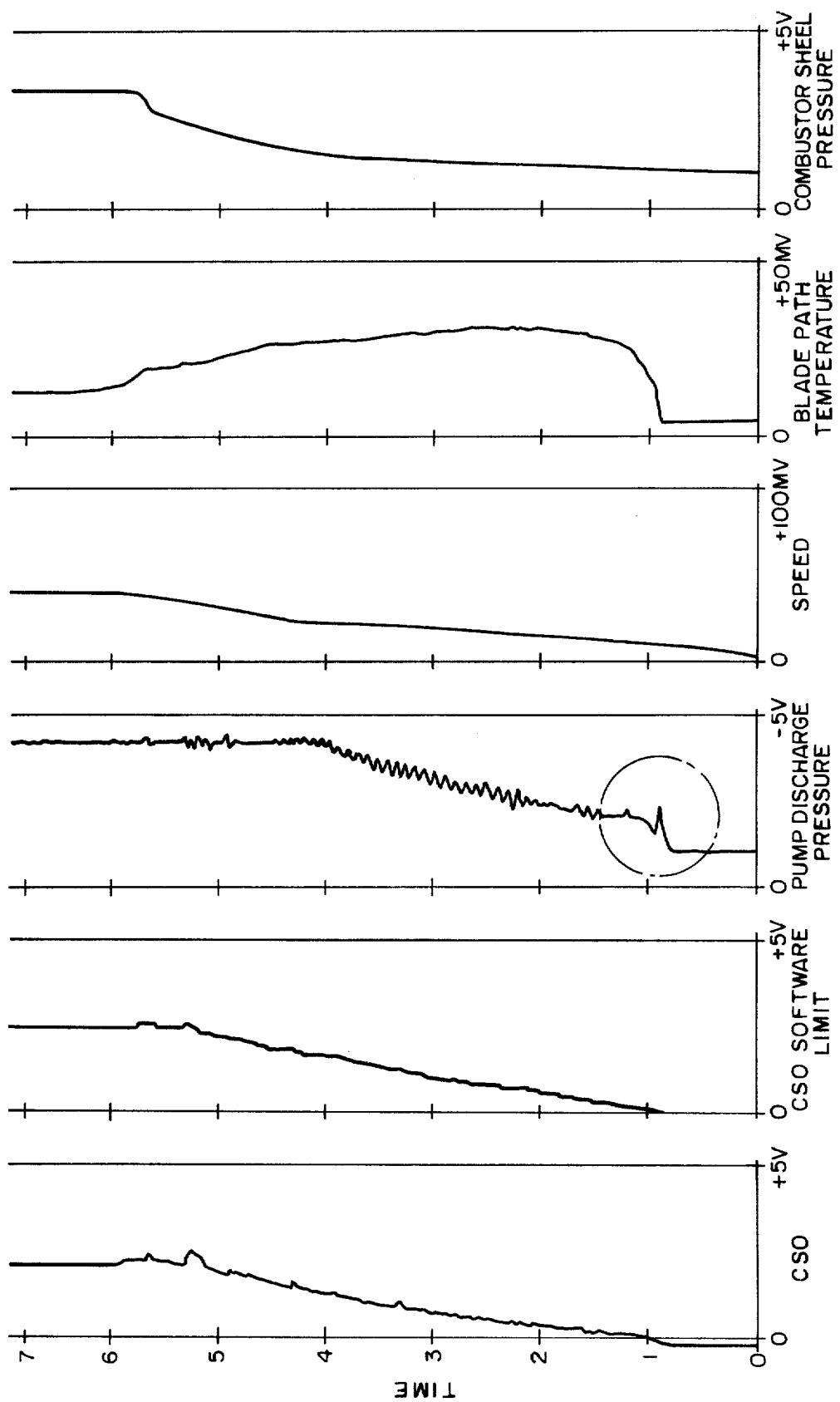
FIG.14A - PRIOR ART

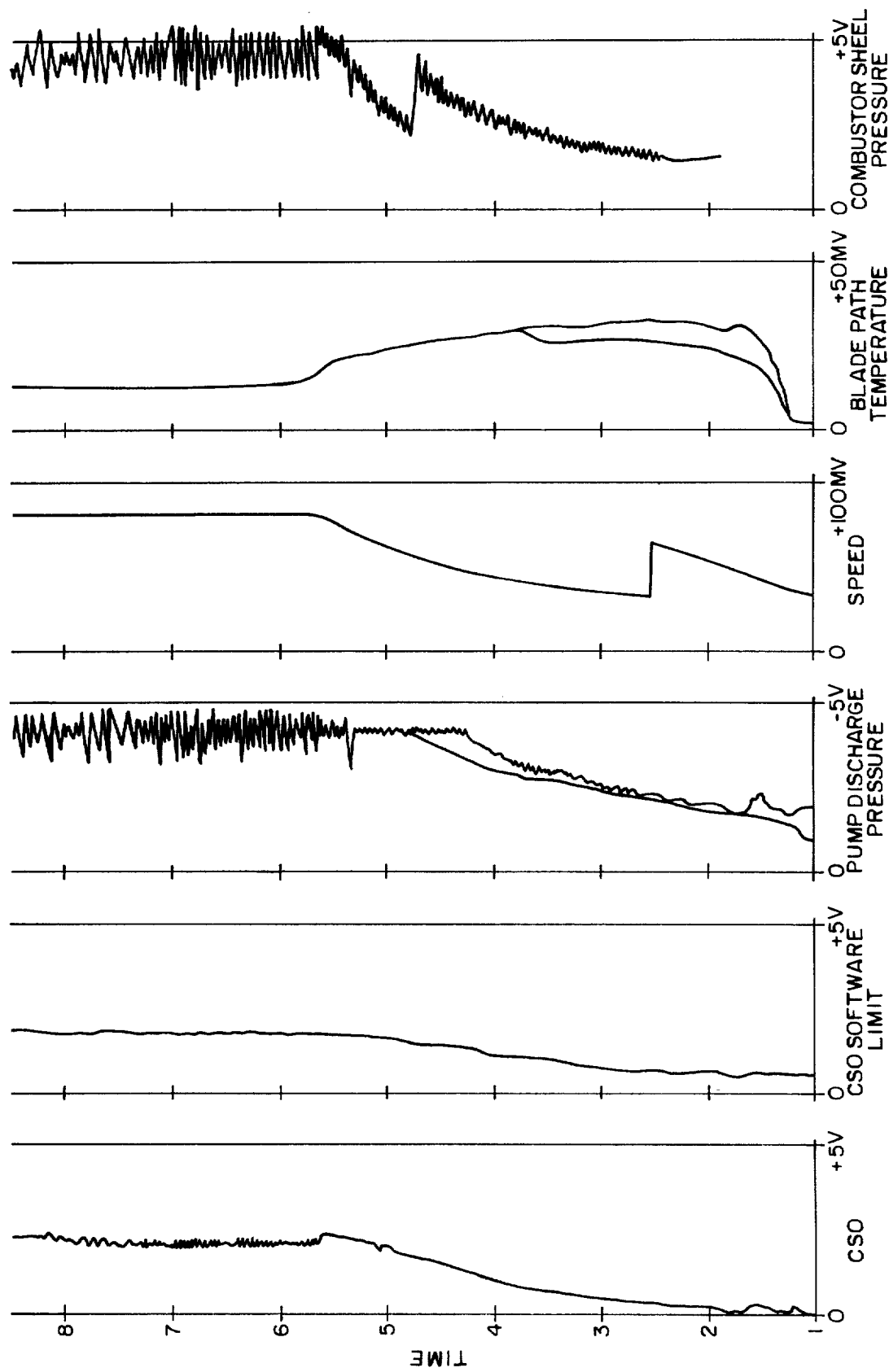
FIG. I4E 3,913,314

SYSTEM AND METHOD FOR OPERATING A GAS TURBINE ELECTRIC POWER PLANT WITH BYPASS FLOW FUELING OPERATION TO PROVIDE IMPROVED RELIABILITY AND EXTENDED APPARATUS LIFE

CROSS-REFERENCE TO RELATED APPLICATIONS

Ser. No. 82,470 filed by J. Reuther and T. C. Giras on Oct. 20, 1970, entitled "Improved System and Method For Operating Industrial Gas Turbine Apparatus and Gas Turbine Electric Power Plants Preferably With a Digital Computer Control" and assigned to the present assignee.

Ser. No. 82,469 filed by R. Kincaden and R. Yannone on Oct. 20, 1970, entitled "Improved System and Method For Accelerating and Sequencing Industrial Gas Turbine Apparatus And Gas Turbine Power Plants Preferably With a Digital Computer Control System" and assigned to the present assignee.

Ser. No. 82,467 filed by J. Rankin and F. Reed on Oct. 20, 1970 entitled "Improved Control Computer Programming Method And Improved System And Method For Operating Industrial Gas Turbine Apparatus And Gas Turbine Electric Power Plants Preferably With a Digital Computer Control System" and assigned to the present assignee.

BACKGROUND OF THE INVENTION

The present invention relates to gas turbine electric power plants and more particularly to improved fuel system operations directed to achieving better startup and loading in such plants.

In the operation of gas turbine electric power plants it is desirable to provide fast startup capability consistent with investment and operating economics of the plant apparatus and other considerations. To achieve security of electric power delivery to customers, it is also desirable to provide high reliability in gas turbine plant operation.

With respect to plant startup operations, a plant which has fast startup capability and high reliability is characterized as having high availability which is a factor especially important to peaking applications of gas turbine electric power plants. Reliability in large measure results from the plant design and the quality of plant manufacture. With respect to plant control, plant reliability may be enhanced by the basic design of the control and by including in the control design multiple provisions for controlling or limiting particular plant variables. Thus, reliability by multiplicity can directly enhance plant availability.

Normally, faster gas turbine plant startups cause greater temperature or thermal stress cycling damage to the turbine blades and other metal parts. Therefore, some balance must be achieved between startup speed and turbine life, i.e., the long term cost of turbine damage caused by thermal stress cycling. To improve the plant life expectation or to improve startup availability of gas turbine electric power plants by faster startup without added metal damage, it is desirable to identify avoidable causes of stress damage and determine improvement means by which such damage can be avoided in a manner which is compatible with all other plant operating considerations. Added benefit is realized if the improvement means also provides reliability by multiplicity.

One cause of thermal stress damage occurs in the supply of fuel and especially liquid fuel to the turbine nozzles. Thus, oil or other liquid fuel is typically supplied to the turbine from a fuel source by a turbine driven pump. The fuel flows from the pump through a valve arrangement, typically including an isolation valve and a throttle valve. The pump develops fuel pressure as a function of the turbine speed, and the nozzle fuel pressure is typically kept within tolerances by positive regulation of the pump discharge pressure. Fuel pressure regulation can be achieved by regulating the flow of bypass fuel from the fuel supply line back to the fuel source, or it can be achieved by suitable means adapted to control the manner in which the pump itself functions. In any case, fuel pressure fluctuations due to transient conditions not correctable by the pressure regulator can cause excessive thermal stress cycling of the turbine metal parts during ignition and at other operating time periods including idle operation and light load operation.

In the case of the bypass pressure regulator type of fuel system, a bypass valve has its opening regulated by an electropneumatic or other control to keep the pump discharge pressure at a setpoint value. During and shortly after ignition, the pressure setpoint is derived from a ramp function and thereafter it is fixed. In one prior art product, like that disclosed in the aforenoticed copending patent application Ser. No. 82,470, an unregulated limiter valve has been used in parallel with the discharge pressure regulator valve to provide additional bypass flow, but that valve was fully closed during combustion of liquid fuel and it was fully open to provide added bypass flow substantially only when no liquid fuel was flowing to the nozzles, i.e., prior to ignition and during turbine operation on gaseous fuel in dual fuel turbines. Thus, the added bypass flow served to reduce pump discharge pressure when the fuel was simply being circulated within the liquid fuel system.

Generally, the prior art bypass regulator pump discharge system has not been sufficiently responsive during ignition and other operating time periods to prevent rapid transient fuel pressure oscillations, corresponding oscillations in turbine inlet air temperature and corresponding cycling in thermal stress in turbine metal parts. Further, with a bypass regulator mechanism defect which allows or causes excessive fuel pressure or excessive cyclic fuel pressure variations to occur without causing system failure and shutdown, there has typically been no alternative mechanism by which the effects of the defect could be limited, i.e., reliability has been somewhat restricted.

SUMMARY OF THE INVENTION

An electric power plant is provided with an industrial gas turbine for drive power. The gas turbine is provided with a fuel system permitting operation of the turbine on one or more fuels. A liquid fuel subsystem preferably having a source of liquid fuel, a turbine driven pump for pumping liquid fuel from the source to the turbine combustion element, a throttle valve for regulating the flow of liquid fuel to the combustion element, a main flow path connecting the pump to the throttle valve and the throttle valve to the combustion element, and a bypass flow path from the main flow path having means therein for controlling pump discharge pressure, is operated efficiently to minimize inconsistencies in fuel scheduling from startup to startup, to stabilize combustion and to provide reduced stress damage to turbine components due to thermal transients or oscillations. Such efficient operation is achieved through the joint operation of a turbine control system and the pump discharge pressure control means and other bypass fuel flow regulating means operated in the bypass flow path substantially independently of the control system to control combustor nozzle fuel pressure over the various modes of gas turbine operation.

BRIEF DESCRIPTION OF THE DRAWINGS

FIG. 4 shows the arrangement of the combustion elements of the gas turbine in FIGS. 1-3.

FIGS. 5 and 6 show a fuel nozzle and parts thereof employed in the gas turbine of FIGS. 1-3.

FIG. 7 shows a schematic diagram of a gas fuel supply system employed with the gas turbine of FIGS. 1-3.

FIG. 8 shows a schematic diagram of a liquid fuel supply system employed with the gas turbine illustrating a valve arrangement implemented in accordance with the principles of the invention.

FIG. 12 shows certain control signal characteristics associated with the analog circuitry of FIG. 11.

FIGS. 14A-F shows various graph data demonstrating efficiencies in fuel system operation realized through application of the principles of the invention.

DESCRIPTION OF THE PREFERRED EMBODIMENT

General

Figure 1:
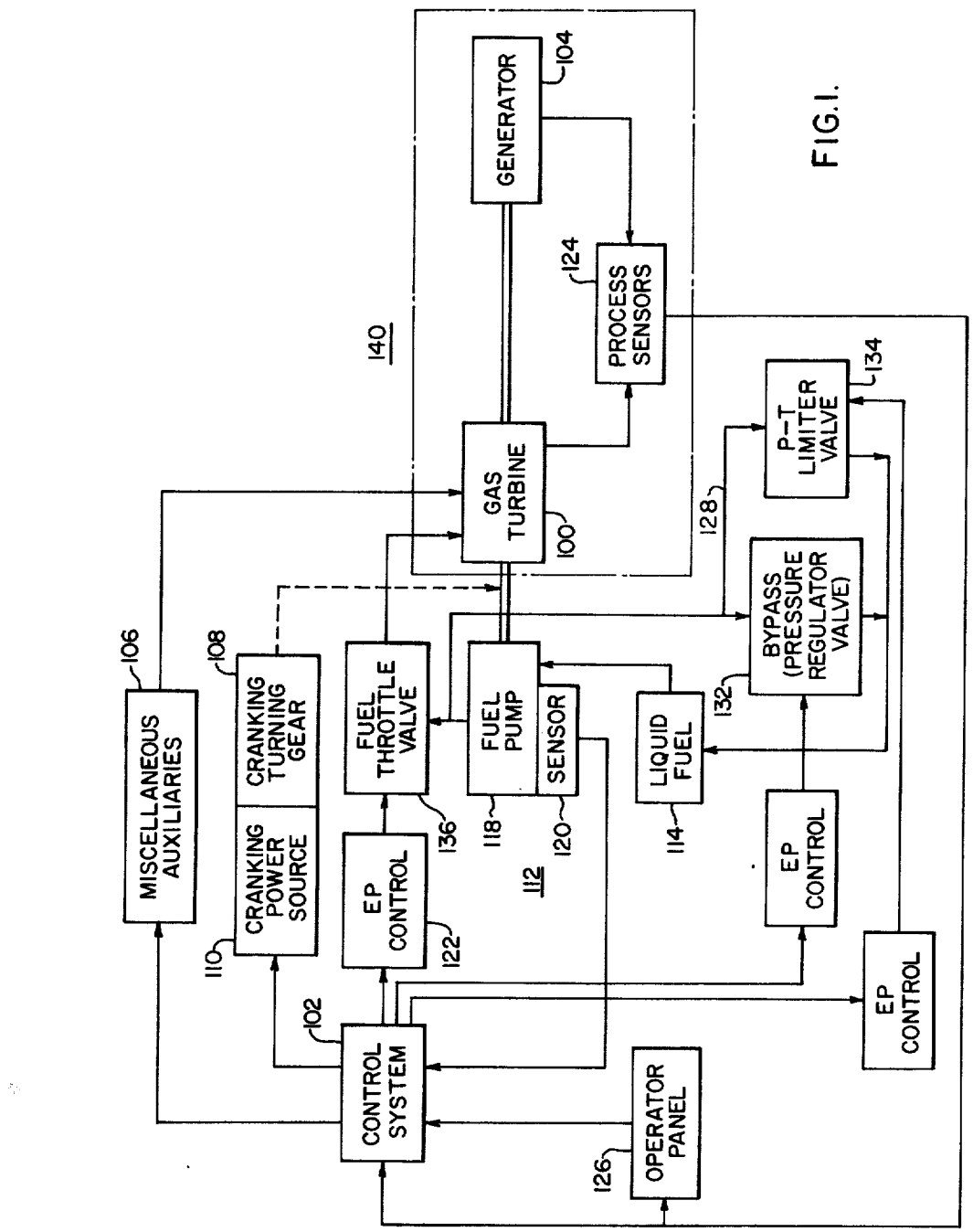
FIG. 1 shows a schematic block diagram of a gas turbine electric power plant illustrating a gas turbine fuel system and a control system for operating the fuel system in accordance with the principles of the invention.

A preferred arrangement of the invention is shown in FIG. 1 and it illustrates an electric power plant 140 which includes an industrial gas turbine 100 provided with a control system 102 for driving an electric power plant generator 104 for the production of electric power. Efficient operation of the turbine 100 is enhanced by the control system 102 in accordance with the principles of the invention, during all cycles or modes of gas turbine operation, from startup through ignition and finally to load operations.

Control of the turbine 100 includes control over the turbine auxiliaries 106 which include an auxiliary lubrication pump, an AC and a DC fuel transfer pump, a turning engine and a turning gear starter (such auxiliary elements not specifically shown in the drawing). A turning gear 108 and a source of power 110 for the turning gear is also provided. Control of the auxiliaries is exercised principally during startup operations to be hereinafter more fully described.

In order to control turbine operations, the supply of turbine fuel is placed under control to initiate combustion and to sustain combustion once ignition has occurred. Typically, industrial turbines are provided with a dual fuel system (not shown in FIG. 1), allowing the burning of either gas or liquid fuel. For the purposes of describing the principles of the present invention, discussion will be limited to operation of the turbine 100 on liquid fuel. However, the application of the invention to gaseous or dual fuel systems will be generally considered subsequently herein.

A liquid fuel supply subsystem provides for liquid fuel flow to a plurality of nozzles in combustor baskets from a source of fuel 114 through piping and various pneumatically operated valves 136 by means of the pumping action of a turbine shaft driven main fuel pump 118. Pump discharge pressure is sensed for control system use by a suitable sensor 120. Details of the operation of a suitable liquid fuel subsystem will be described more fully subsequently herein.

Pneumatic positioning of a throttle and any other fuel supply valves 136 by conventional electropneumatic controls 122 is accomplished as a function of fuel valve control signals developed by the control system 102. The control system may take one of various forms. For example, a hard wired electronic system may be suitable for providing the desired control functions. Alternatively, control may be achieved through a software program executed by a digital computer in a direct digital control system. As another alternative, the control system may provide a combination of hardwired and software implemented control.

In order to perform the control functions required to achieve efficient and flexible control over the gas turbine 100 throughout the various cycles of operation, various control system inputs are provided by suitably located process sensors 124. The turbine speed is continuously sensed by a main turbine speed sensor which employs a magnetic rotor wheel. Desirably, electrical load sensing is provided by a conventional megawatt sensor. Exhaust gas temperature and combustor shell pressure sensors provide corresponding turbine signals. Predetermined generator signals such as voltage can also be generated. All feedback signals are used for the purpose of data monitoring and/or the purpose of controlling the turbine 100 to drive the generator and operate the plant safely within design limits.

Generally, a representation of fuel demand needed to satisfy speed requirements is generated within the control system 102. In this particular arrangement, turbine parameters including the speed, temperature and pressure parameters are employed by the control system to limit or control the fuel demand so that the desired level of electric power is produced without exceeding the apparatus design limits.

Control signals for activating the electropneumatic controls 122 to thereby position the fuel control valve(s) during startup operations are derived principally as a function of required speed, but are limited by other operating constraints, for example, maximum combustor shell pressure or exhaust temperature. During loading operations, fuel is scheduled to the fuel system 112 to maintain a particular generator output or to operate within limits determined by turbine exhaust temperature.

In order to initiate turbine startup, certain turbine and/or power plant conditions must exist and the existence of such conditions is signified by contact closures or other means to the control system and/or the operator via panel 126. For example, all maintenance and transfer switches must be in the correct position for starting and all turbine malfunctions must be corrected.

Once the overall plant status is satisfactory, startup is initiated under control of the operator and/or the control system 102. Turbine subsystems are started in parallel where appropriate to reduce the time required for startup. Preferably, completion of one sequence step generally dictates initiation of the next sequence step unless one or more of a plurality of process sensors determines that conditions exist to occasion shutdown of the turbine 100.

The starting sequence generally embraces starting the plant lubrication oil pump, starting the turning gear, starting and operating the starting engine to accelerate the gas turbine 100 from low speed, stopping the turning gear, igniting the fuel in a turbine combustion system at about 20 percent speed, continuing the fuel combustion and accelerating the gas turbine to about 60 percent speed and stopping the starting engine and accelerating the gas turbine to the desired speed or operating level. The ignition period is typically restricted to about 1 minute since continued fuel supply for any greater time without ignition can lead to a potentially explosive and extremely dangerous condition.

During ignition, liquid fuel is generally supplied to the gas turbine 100 by the control system 102 to satisfy certain predetermined operating conditions. Thus, nozzle fuel pressure needs to be stable and high enough to produce stable combustion. Further, it is desirable to maintain turbine inlet temperatures within certain limits. However, supplying fuel with excessive transient oscillatory nozzle fuel pressures normally causes excessive cycling of turbine inlet air temperatures, resulting in unnecessary thermal stress cycling and consequent life shortening damage to turbine components, for example turbine blading. Supply of fuel at extremely low nozzle fuel pressures will result in turbine outfires and consequent diminishment of startup availability which is a key performance factor in the electric power industry since it is an indicator of backup power generation capability and power supply security.

The control system 102 provides throttle valve regulation to control nozzle fuel supply. It also controls a bypass flow path, in this arrangement including valves in the form of a pressure regulator bypass valve 132 and a pressure-temperature limiter valve 134 which is operative substantially independently of the control system 102 to control or limit the pressure of the fuel supplied to the turbine nozzles.

The pressure-temperature limiter valve 134 may take various forms. In a preferred arrangement of an embodiment of an invention herein described, a two-position pressure-temperature limiter valve 134 is employed for control purposes.

During startup operation, while the supply of liquid fuel to the turbine nozzles is shut off, the turbine shaft driven fuel pump 118 is in operation so that liquid fuel pressure is building up. Such fuel pressure is under the control of the pressure regulator valve 132. At this time, the pressure-temperature limiter valve 134 is fully open and provides a bypass fuel flow dependent on the rising pump discharge pressure.

In one particular application of the invention, it is desirable that the ignition fuel pressure at the nozzles be within a tolerance range 3 to 8 pounds per square inch during turbine operation. In order to achieve fuel system control such that nozzle fuel pressure be confined to this range and that the other turbine operating constraints be satisfied, positive control is exercised over the flow of liquid fuel through the fuel throttle valve 136 by the control system 102.

The control arrangement 102 sets the bypass flow from the nozzle fuel flow path to the liquid fuel supply source 114 so that, at least during the more critical transient operating periods, fuel pump discharge pressure and nozzle fuel pressure will be built directly as a function of the increase of pump speed as the turbine accelerates, with reduced fuel pressure oscillations and reduced turbine inlet air temperature oscillations. Throughout turbine operations, the established pump pressure in conjunction with the position of the fuel throttle valve 136 and the bypass fuel flow, accurately sets the required nozzle fuel pressure within a predetermined tolerance to produce combustion with flame stability. The pressure-temperature limiter valve 134 further functions to reduce pressure on components of the fuel system 112 when the turbine 100 is operated on gas fuel and the liquid fuel system is turned off but disposed in a circulatory state.

It should be appreciated that the bypass flow provision can take other forms in different applications of the invention. For example, pump discharge pressure may be regulated by means other than a regulatory bypass valve and in that case bypass flow would be limited to pressure limit action. As another example, an orifice in parallel with a valve like the pressure regulator valve 132, or an orifice internal to a valve like the pressure regulator valve 132 may be used. However, in the preferred arrangement, a valve with an adjustable minimum setting is used so that settings may be made to conform to variations in fuel pump characteristics and variations in throttle valve characteristics.

In the event that some malfunction occurs such that the pressure-temperature limiter valve 134 becomes inoperative, the control system 102 provides additional means for controlling fuel pressure at the nozzles. Thus, backup fuel control is provided during pressure-temperature limiter valve limit action to provide reliability by multiplicity.

During the ignition period, the pressure regulator valve 132 is closed and the pressure-temperature limiter valve 134 dominantly determines the fuel pressure by operating in a pressure limiting mode, i.e. the preferred two position valve is positioned at its minimum position to produce fuel pressure limiting action. As a result, smooth fuel pressure buildup is provided during the ignition period. Shortly after ignition, the pressure regulator valve 132 is preferably again operated by the control system 102 to regulate the pump discharge pressure, and the preferred pressure-temperature limiter valve 134 provides bypass fuel flow at its minimum setting. In this manner, fast startup is made possible under the dominant fuel pressure regulation provided by the pressure regulator valve 132 with secondary or backup pressure limit action from the pressure-temperature limiter valve 134. During the balance of the startup period, fuel pressure oscillations under pump discharge pressure regulation generally are considerably reduced as compared to the conventional ignition period oscillations and, therefore, the limit action of the pressure-temperature limiter valve can be made secondary to allow faster startup without materially adversely affecting the turbine from a temperature cycling standpoint. As considered more fully subsequently herein, the minimum position of the preferred two position pressure-temperature limiter valve 134 can be set to help establish the desired fuel pressure control and limit action. It is also noteworthy that in the post ignition period with the preferred control and limit operation, the pressure-temperature limiter valve 134 functions as a fuel pressure limit backup to provide reliability by multiplicity.

When the turbine 100 is operated under idle and light load conditions, the bypass fuel flow through the path 128 smooths out fluctuations in pump discharge pressure known to cause turbine inlet temperature transients due at least in part to valve plug effects. In dual fuel systems (not shown in FIG. 1) the bypass flow path 128, including in this arrangement the pressure regulator valve 132 and the pressure-temperature limiter 134, provides for reducing pressure in the liquid fuel system to thereby minimize wear on the liquid fuel system components. The pressure-temperature limiter valve 134 is moved to its wide open position.

A reduced need exists for fuel pressure limiting in gas systems since gas is ordinarily supplied to the turbine location at supplier regulated pressure and because the tolerance range of nozzle gas pressure is wider than that of nozzle liquid fuel pressure. Thus, although the principles of the present invention can be applied to a gas fuel supply system, they find greatest application in liquid fuel supply systems.

COMPUTER OPERATED TURBINE PLANT

Figure 2:
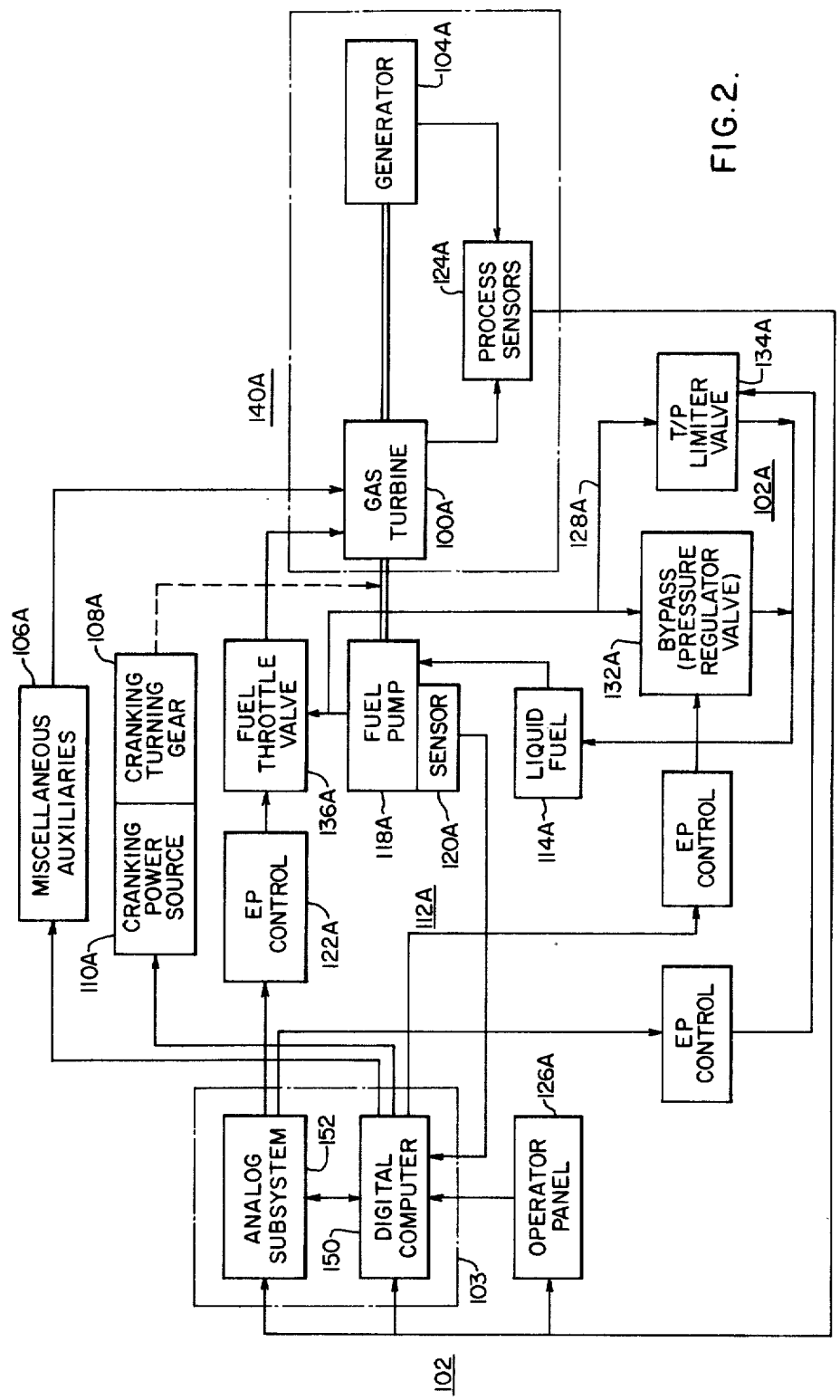
FIG. 2 shows the gas turbine electric power plant of FIG. 1 with an illustration of a particular embodiment of the control system in accordance with the principles of the invention.
Figure 3:
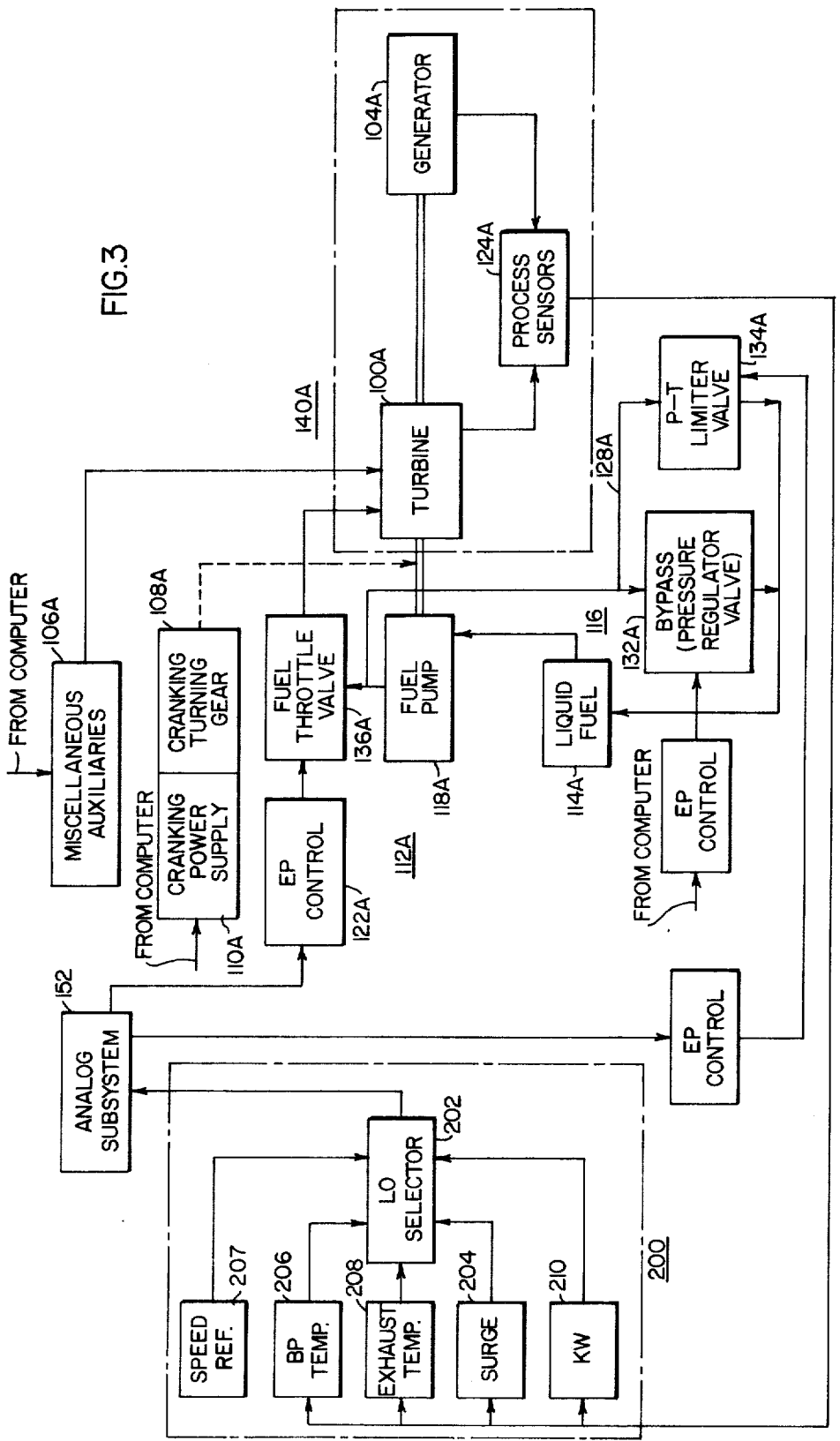
FIG. 3 shows the gas turbine electric power plant with a functional block diagram of the control functions embodied in the control system of FIG. 2.

A more particular preferred embodiment of the present invention is shown in FIGS. 2 and 3. Where elements are employed like those described in connection with FIG. 1, like or identical reference characters are used. In the instant embodiment, the control system 102 for the turbine 100 is a hybrid arrangement 103 which includes a digital computer 150 and an analog subsystem 152. The computer in this case is a P50, sold by Westinghouse Electric Corporation under the tradename PRODAC 50. Generally, the P50 computer system employs a 16,000 word core memory with a word length of 14 bits and a 4.5 microsecond cycle time. The P50 is capable of handling a large volume of data and instructions so as readily to provide for handling the tasks associated with controlling and operating one or more gas turbine plant units.

The P50 core memory is expandable and by addition of functional modular units, the P50 is capable of substantial increase in its analog input capacity, contact closure inputs, and contact closure outputs. Data communication is provided for the P50 by 64 input and output channels, each of which provides a 14 bit, parallel path into or out of the computer main frame. The P50 addressing capability permits selection of any of the 64 input/output channels, any of the 64 word addresses for each channel and any of the 14 bits in each word. Over 50,000 points in a process can thus be reached individually by the P50 computer system.

A computer program system is organized to operate the computer 150 so that it interacts with other control system elements and plant devices to operate the plant 140A as required to produce electric power. The program system preferably comprises a sequencing program principally for supervising plant start-up and a control program for regulating fuel demand during start-up and load operation. Each of these programs is further subdivided into groups of programs or subprograms intended for specific tasks. The program system preferably makes most of the plant operational determinations, and corresponding computer output signals are generated for application to the external control hardware. An executive program schedules use of the computer 150 by the various programs of the software system in accordance with a predetermined priority structure. Input/output operations and other support functiona are provided by various support programs which are included as part of the executive package and which are subject to the priority supervision of the executive program. Hardware and program system description will be presented herein only to the extent necessary to reach an understanding of the invention.

Generally, the sequencing program accepts contact closure inputs and operator panel inputs and makes programmed logic decisions to provide through contact closure outputs plant start-up and other functions including alarms prior to, during and after start-up. The sequencing program further operates to supervise the control program by specifying the control mode of operation and the selected load. The control program functions in various turbine control loops and generates turbine control outputs in such loops and transmits data to the sequencing program, including, for example hot blade path temperature indications during load operation which require plant alarm and shutdown.

Other programs in the program system include an automatic synchronization program which provides a facility for operating a voltage regulator rheostat associated with the generator 104 and for adjusting turbine speed during automatic synchronization, an operator's console program which provides for interfacing an operator's panel 126A with the computer 150, an alarm program which generates alarm indications when plant variables exceed predetermined limits, an analog output pulser program which provides for generation of accurate external analog voltages corresponding to internal digital determinations, an analog scan executive program and a thermocouple check program. Other programs included in the program system are classified as miscellaneous. For more detail on the P50 computer and a program system used in it for gas turbine electric power plant operation, the aforementioned copending patent application Ser. No. 82,470 is hereby incorporated by reference.

Plant startup has been hereinbefore generally considered in connection with FIG. 1 and some further consideration of it will serve to show the role of the computer 150 in startup operations in the embodiment of FIG. 2. Under program control, the computer 150 preferably initiates plant start-up. A programmed computer master contactor function and operation selectors are preferably employed to force the sequence of starting and operation to assure that the turbine startup will normally take place over a fixed, predefined time interval. For plant startup to be enabled, certain plant conditions must exist. Thus, the software master contactor serves to establish and disestablish logic conditions necessary for initiating the making and breaking of external control circuits for equipment startup operation under predetermined plant and equipment conditions.

The hybrid computer control 103 generally operates the gas turbine 100 with control directives that are compatible with turbine protection needs and orderly management over advances in the gas turbine operational process. The hybrid control system 103 operates in this embodiment in a control loop arrangement 200 (FIG. 3) in which the hybrid interface is such as to provide for software speed reference generation and software selection of a single low fuel demand limit for application to speed control circuitry in the analog subsystem 152 (such speed control circuitry not specifically shown in FIG. 2).

The control loop arrangement 200 shown in FIG. 3 provides a representation of the preferred general control looping in which the preferred control system functions. The control loop arrangement 200 comprises a plurality of individual control loops which are operational under differing time and operational conditions. It is within the context of the operating control loops that fuel bypass operations are performed to produce reduced fuel pressure and air temperature cycling.

In the multiple control loop arrangement 200, a low fuel demand selector block 202 is preferably employed to determine by low fuel demand selection which control loop is dominant at any one time, i.e., to determine which software controller is to generate an output fuel or speed demand signal. Limit fuel demand representations are generated respectively by a surge control 204, a blade path temperature control 206, and an exhaust temperature control 208. In this application, a load control block 210 becomes operative, after generator synchronization, with the limit blocks 204, 206 and 208. A speed reference 207 generates a fuel demand as an input to the low selector block 202, and normally the speed fuel demand is dominant during startup as a feed forward controller which causes turbine acceleration to synchronous speed in a fixed time. By low select, any of the limit control loops can be dominant during startup or load operations.

The surge control 204 responds to sensed combustor shell pressure and compressor inlet temperature to generate a surge limit representation for compressor surge prevention. The representation varies with the ambient temperature, and the representation for startup operation is different from the representation during load operation.

The blade path temperature control 208 responds to combustor shell pressure in accordance with a first preferably non-linear temperature reference characteristic for normal start-up and a second preferably non-linear temperature reference characteristic for emergency startup.

The exhaust temperature control 208 responds to combustor shell pressure in accordance with a first preferably non-linear temperature reference characteristic for base load operations, a second preferably non-linear temperature reference characteristic for peak load operation and a third preferably nonlinear temperature reference characteristic for system reserve load operation. The blade path temperature reference characteristics correspond respectively to 1200°F and 1500°F turbine inlet temperature while the load reference characteristic corresponds to respectively higher values of turbine inlet temperature. For an expanded discussion of the control loop functions with associated curves, reference is made to the afore referenced copending application Ser. No. 82,470.

As already indicated, the fuel demand signal at the output of low selector block 202 is that which satisfied the least fuel demand made by the speed reference block 207 the KW block 210 and the limit control blocks 204, 206 and 208. The output of low select block 202 is converted and applied as a speed demand signal to the analog subsystem or cage 152.

In order to clarify the implementation of the invention in the plant apparatus, the combustion system of gas turbine 100 comprising an arrangement of combustor baskets 218, is schematically illustrated in FIG. 4. The combustor baskets 218 are cross-connected by cross-flame tubes 222 for ignition purposes. A computer sequenced ignition system 224 includes igniters 226 and 228 associated with respective groups of four combustor baskets 218. In each basket group the combustor baskets 218 are series cross-connected and the two groups are cross-connected at one end only as indicated by the reference character 230.

Generally, the ignition system 224 includes an ignition transformer and wiring to respective spark plugs which form a part of the igniters 226 and 228. The spark plugs are mounted on retractable pistons within the igniters 226 and 228 so that the plugs can be withdrawn from the combustion zone after ignition has been executed.

A pair of ultraviolet flame detectors 232 and 234 are associated with each of the end combustor baskets in the respective basket groups in order to verify ignition and continued presence of combustion in the eight combustor baskets 218. Redundancy in flame sensing capability is especially desirable because of the hot flame detector environment.

The flame detectors 232 and 234 can be, for example, Edison flame detectors model 424-10433. Generally, the Edison flame detector responds to ultraviolet radiation at wavelengths within the range of 1900 to 2900 angstroms which are produced in varying amounts by ordinary combustor flames, but not in significant amounts by other elements of the combustor basket environment. Detector pulses are generated, integrated and amplified to operate a flame relay when a flame is present. Ultraviolet radiation produces gap voltage breakdown which causes a pulse train. The flame monitor adds time delay before operating a flame relay if the pulse exceeds the time delay.

In FIG. 5 there is shown a front plan view of a dual fuel nozzle mounted at the compressor end of each combustor basket 218. An oil nozzle 238 is located at the center of the dual fuel nozzle 236 and an atomizing air nozzle 240 is located circumferentially about the oil nozzle 238. An outer gas nozzle 242 is disposed about the atomizing air nozzle 240 to complete the assembly of the fuel nozzle 236.

As indicated in the broken-away side view in FIG. 6, fuel oil or other liquid fuel enters the dual fuel nozzle 236 through a pipe 244 while atomizing air for the fuel oil enters a manifolded pipe arrangement 246 through entry pipe 248 for flow through the atomizing air nozzle 240. Gaseous fuel is emitted through the nozzle 242 after flow through entry pipe 250 and a manifolded pipe arrangement 252.

In the turbine plant 140 or 140A, a fuel system 251 is provided for delivering gaseous fuel to the gas nozzles 242 under controlled fuel valve operation as schematically illustrated in FIG. 7. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37.2-1956.

A starting valve 256 determines gas fuel flow to the nozzles 242 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 242 under the pneumatic positioning control of an electropneumatic converter 263 and a pneumatic pressure booster relay 265. The converter 263 also responds to an electric control signal.

A pneumatically operated trip valve 260 stops gas fuel flow under mechanical actuation if turbine overspeed reaches a predetermined level, such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal. A pressure switch 267 indicates the fuel pressure at the inlet to the nozzles 242.

As schematically shown in FIG. 8, the liquid fuel supply system 112 provides for liquid fuel flow to the eight nozzles 238 from the plant fuel source 114A through piping and various pneumatically operated valves by means of the pumping action of the turbine shaft driven main fuel pump 118A. Pump discharge pressure is sensed for control system use by detector 120A. The bypass valve 132A is pneumatically operated by an electropneumatic converter 270 and a booster relay 272 to determine liquid fuel bypass flow through a bypass flow path 128A and thereby regulate liquid fuel discharge pressure over a substantial portion of the operating time of gas turbine 100. The pressure-temperature limiter valve 134A, in parallel with the bypass valve 132A, is pneumatically operated by an electropneumatic converter 273 andd a booster relay 275 to determine liquid fuel bypass flow through the bypass flow path 128A during turbine ignition and to partially determine such bypass flow over other portions of the operating time of the turbine 100 as hereinbefore discussed.

Electric control signals provide for fuel pump discharge pressure control through the valve 132A, and, in particular, they provide for ramp pump discharge pressure control during turbine startup. A throttle valve 136A is held at a predetermined fixed position during the ramp pressure control action. A pressure switch 269 provides for DC backup pump operation on low pressure, and a pressure switch 271 indicates whether the pump 118A has pressurized intake flow.

After fuel pressure ramping, the pneumatically operated throttle valve 136A is positioned to control liquid fuel flow to the nozzles 238 as determined by an electropneumatic converter 274 and a booster relay 276.

An electric control signal determines the converter position control action for the throttle valve 136A. The bypass valve 132A and the pressure-temperature limiter valve 134A in the bypass flow path 128A continue to operate to hold pump discharge pressure substantially constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve 282 provides on/off control of liquid fuel flow to a liquid manifold 283.

Eight positive displacement pumps 284 are respectively disposed in the individual liquid fuel flow paths to the nozzles 238. The pumps 284 are mounted on a single shaft and they are driven by the oil flow from the manifold 283 to produce substantially equal nozzle fuel flow. Check valves 286 prevent back flow from the nozzles 238 and a pressure switch 288 indicates fuel pressure at the oil nozzles 238. A manifold drain valve 290 is pneumatically operated under electric signal control during turbine shutdown to drain any liquid fuel remaining in the manifold 283.

To achieve liquid fuel control, the hybrid control system 103 positions the fuel bypass valves 132A and 134A and the fuel throttle valve 136A during turbine operations. Ultimately, fuel control actions are developed to produce desired turbine speed and/or load operations.

After the turbine is cranked by diesel or other means to a predetermined speed such as 20% rated speed, fuel flow is commenced to achieve and sustain fuel combustion.

With the use of liquid fuel, the turbine driven pump 118A develops the fuel pressure needed to produce the nozzle fuel flow within the nozzle pressure tolerance band required for proper combustion. Since the pump discharge pressure developed as a function of turbine speed is normally greater than the required pressure, the value 132A is controllably operated by the hybrid control system 103 to bypass some of the fuel from the nozzle flow path to the fuel supply 114A, thereby to regulate the pump discharge pressure to a setpoint value. Without further limit action, fuel pressure oscillations nonetheless will occur, particularly during the ignition period, as a result of various causes, to the extent that the response of the feedback sensors or the pressure regulator as a whole is inadequate to produce smooth fuel pressure regulation. To smooth out nozzle fuel pressure transient oscillations and related turbine inlet air temperature oscillations under various turbine operating conditions and particularly during the ignition period, a certain portion of the fuel made available by the pumping action of the fuel pump 118A is bypassed from the nozzle flow path to storage through the pressure temperature limiter valve 134A in bypass flow path 128A. Once it is operated by the computer 150 to achieve dominant fuel pressure limit control during the ignition period, the preferred pressure-temperature limit valve 134A functions independently as a mechanical valve device in its minimum position to produce fuel pressure and temperature smoothing performance consistent with combustion and starting duration goals.

During ignition, the throttle valve is fixed at a predetermined position, and primary control of fuel bypass flow and nozzle fuel pressure is achieved by the pressure-temperature limiter valve 134A at its minimum position as a result of a combination of the setpoint control action taken relative to the pressure regulator valve 132A, the pump discharge pressure rise with speed increase, and the flow cross-section which exists in the valve 134A at its minimum position. In normal applications, it is preferred that the minimum position of the valve 134A be field adjusted to produce the preferred pattern of valve control actions during turbine operations. Further consideration of minimum position adjustment of the pressure-temperature limiter valve 134A is presented subsequently herein. With the valve 134A in its minimum position during the ignition period, pump discharge pressure smoothly builds up as a function of the linear increase in pump speed as the turbine accelerates. Such pressure buildup occurs within tolerances to allow stable combustion to occur.

With primary control in the valve 134A during ignition, excessive fuel pressure and temperature variations, otherwise causable by improper computer analog outputs, control system failure in the discharge pressure control loop or the throttle valve control loop, fuel pressure sensor failure, etc., are avoided. Further, surge control ordinarily determines fuel supply during ignition, and temperature oscillations during ignition ordinarily become excessive (such as 150°F) before the temperature limit control can respond to make a correction. The valve 134A makes such control loop operations unnecessary since it provides dominant control during ignition with avoidance of pressure and temperature oscillations.

Upon initiation of ignition, the valve 134A in response to a computer generated signal, is moved from its previous or pre-ignition full open position to its minimum setting. The computer 150 generates an output which results in a fuel pressure setpoint higher than the actual pump discharge pressure at that point in time. Thus, the valve 132A which would otherwise be the primary fuel bypass control mechanism is caused to move to and hold at its fully closed position until the pump discharge pressure rises above the fuel pressure setpoint as the turbine accelerates.

The computer 150 under program control causes the generation of a fuel pressure setpoint higher than the actual fuel pressure during ignition for reasons which will hereinafter be more fully described.

Figure 9:
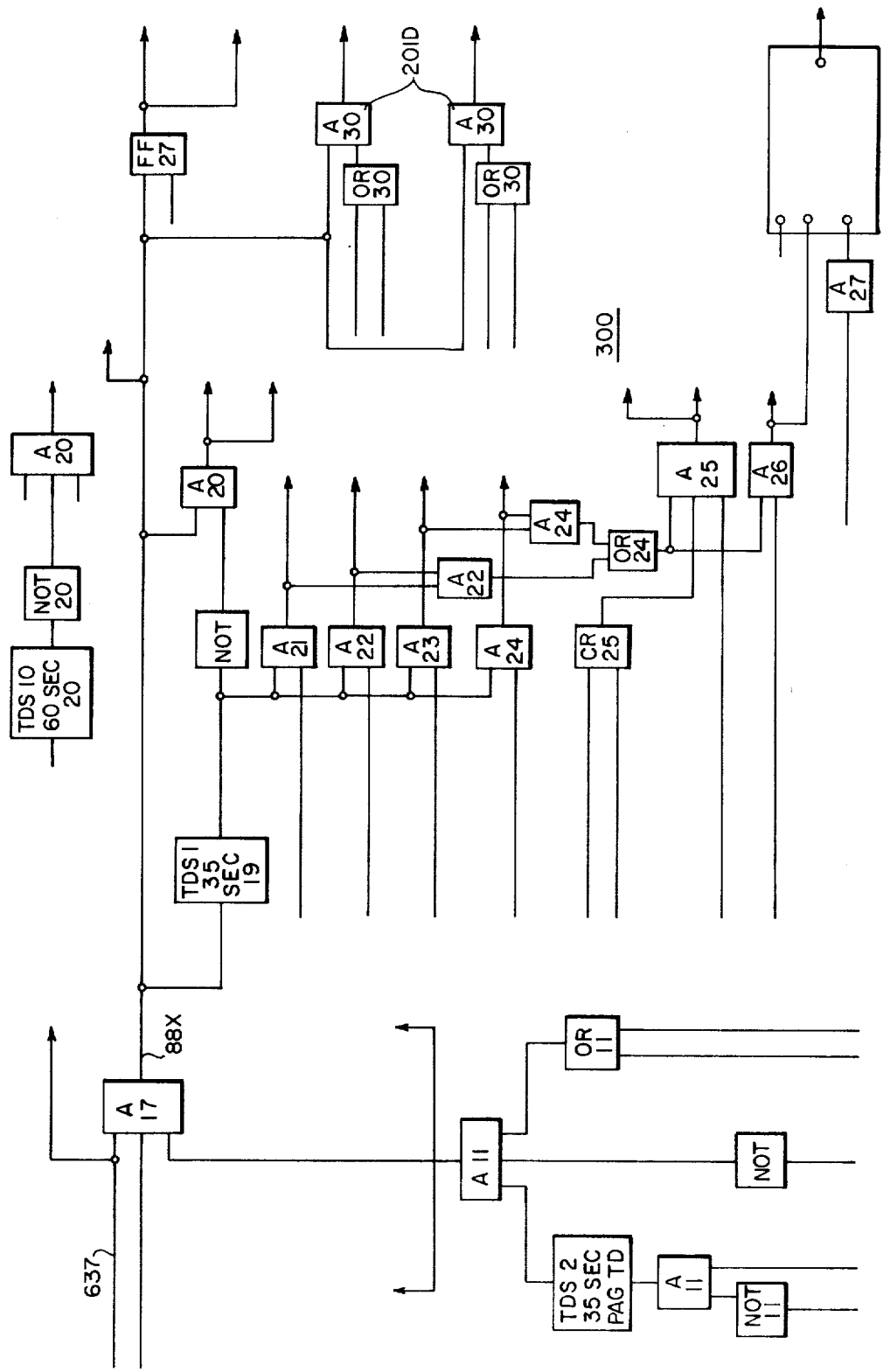
FIG. 9 shows a logic diagram representative of the logic performed in initiating ignition and operating the pressure-temperature limiter valve.

As illustrated in FIG. 9, the computer sequencing program, which is periodically executed as more fully described in the aforereferenced copending application Ser. No. 82,470, includes a set of program steps which logically determine when ignition is to be initiated by a firing relay and what actions are to be taken during ignition. In FIG. 9, the performed logic functions are illustrated in block diagram form rather than the program steps per se.

Referring to FIG. 9, there are shown the logic operations associated with turbine ignition and with the operation of the pressure-temperature limiter valve at ignition. Assuming that the turbine 100 has attained an operating speed of 20% rated, a compressor discharge pressure switch L636 closes causing block OR11 to output a 1. At this point in time, the other inputs to block A11 are also 1's so that the logic conditions exist which cause block A11 to output a 1. At this point, three contact closure outputs close. One of the contact closures causes the overspeed trip valve solenoid to be energized and overspeed trip oil pressure is built up. When the pressure is built up, an input 637 to block A17 representing a pressure switch becomes a 1.

Once all input logic conditions are satisfied for block A17, the ignition relay is caused to be energized by block A20 and a time delay function is initiated by block TD19. When fuel oil is selected block, A20 provides for appropriately timed introduction of atomizing air into the combustor baskets. Other functions performed in firing logic diagram 300 include flame detector logic processing for alarms as provided by blocks A21 through A24. The logic for combustor basket purging and multiple ignition attempts and turbine shutdown following ignition failure is also included in logic diagram 300.

The output 88X of block A17 may be considered as a fuel on signal. Simultaneous with the initiation of ignition, the output 88X of block A17 is provided as an input to oil block A30. Other logic conditions requisite in order that block A30 output a 1 already exist at this time. The output of block A30, signal 201D, causes a contact to close, energizing a solenoid valve which applies air to the diaphragm of the oil isolation valve. The signal 201D, also causes a computer contact closure output which triggers the electropneumatic actuator 273 in FIG. 8 for the pressure-temperature limiter valve. Thus the pressure-temperature limiter valve is caused to be positioned at its minimum position substantially at the initiation of ignition.

The fuel demand is determined by the control system as a function of several interdependent variables. Values for such variables are obtained from computer inputs in the form of representations of various turbine operating parameters, for example, combustor shell pressure and temperatures from one or more positions within the turbine 100. Such representations are applied to the hybrid control system 103 in the form of analog voltages obtained from the various sensors 124A.

Under the turbine conditions existing at ignition, i.e. low air flows, high temperatures and poor velocity for good temperature response, certain difficulties arise in obtaining accurate representations of actual pressures, temperatures, etc. from the sensors 124A. With fuel pressure limiting by independent mechanical means during ignition, adverse oscillatory fuel pressure effects otherwise produced by electrical fuel pressure regulation, as a result of low quality feedback signals, are accordingly avoided. However, as hereinbefore stated, the control system 102 or the computer control 103 provides reliability by multiplicity in that it continues to supply a backup fuel pressure control facility in the event of mechanical or other failure of the independent mechanical means.

Figure 10:
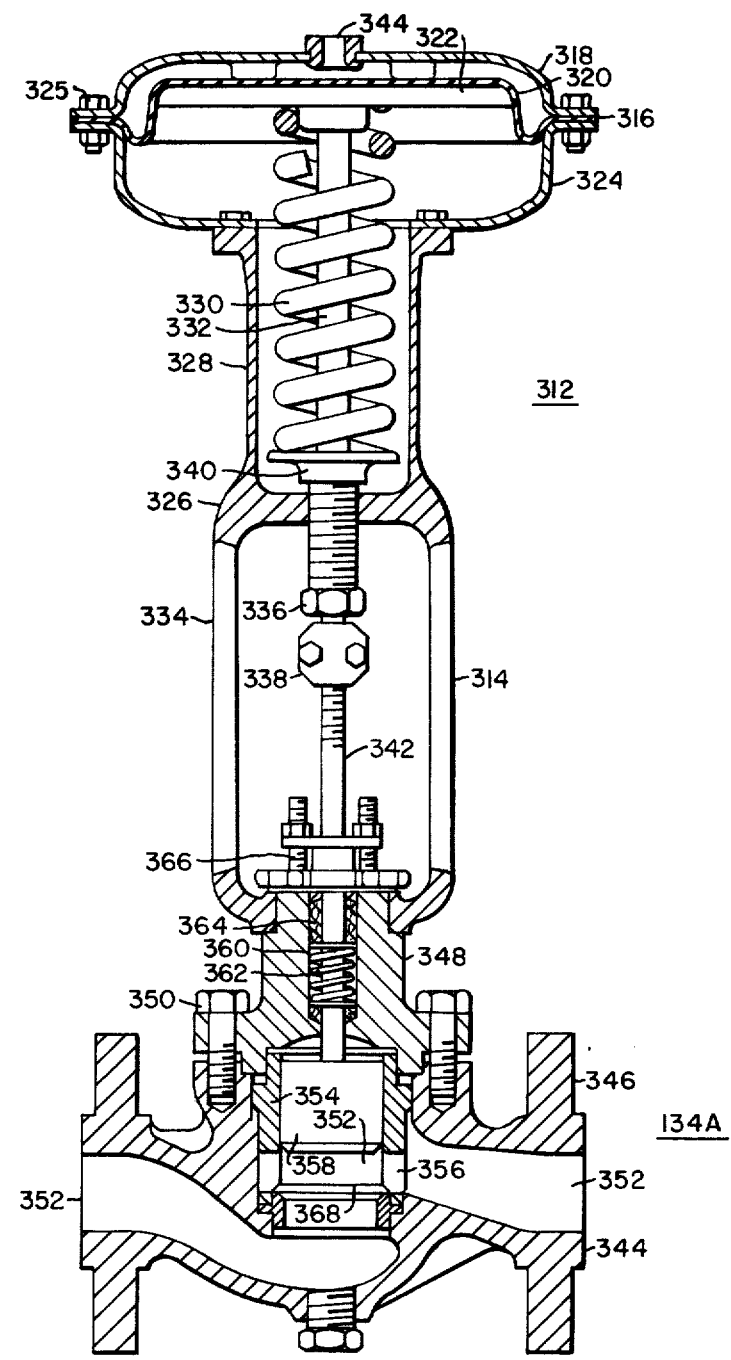
FIG. 10 shows the pressure-temperature limiter valve and the valve actuator in cross section.

There is shown in FIG. 10, a suitable structure usable for the pressure-temperature limiter valve 134A and the pressure-temperature limiter valve actuator 312. The actuator housing 314 comprises a diaphragm case 316 having an upper diaphragm case assembly 318 in which are housed a diaphragm 320 and a diaphragm plate 322 and a lower diaphragm case 324 secured to the upper diaphragm case by cap screws 325. The housing 314 further comprises a yoke 326 having an upper portion 328 for receiving an actuator coil spring 330 and an actuator stem 332, and a lower portion 334 for receiving a downwardly extending portion of the actuator stem 332, a spring adjuster 336, and a valve stem connector assembly 338.

The spring 330 is seated at the bottom of the upper portion of the yoke 326 on a spring seat 340 and extends upwardly into the diaphragm case 316 to abut the underside of the diaphragm plate 332. The actuator stem 332 is secured to the diaphragm plate and extends downwardly through the spring 330 and into the spring adjustor 336 within the lower yoke portion 334. The spring adjuster 336 is threadedly connected to the yoke 326 and disposed about a lower part of the actuator stem 334 and it extends upwardly into the upper portion of the yoke 328 to abut the spring seat 340.

The valve stem connector assembly 338 is disposed below the actuator stem 334 in axial alignment therewith so that a valve stem 342 may be passed through the valve stem connector assembly and inserted into the actuator stem 332. Valve stem 342 is secured to the actuator stem 332 by the valve stem connector assembly 338.

In operation, air from a pneumatic controller (not shown in FIG. 10) is forced through an opening 344 in the top of the diaphragm case 316. Thus, a downward force is exerted on the diaphragm 320 and the diaphragm plate 332. The force exerted downwardly overcomes the initial force of the actuator spring 330 and thereby causes a downward displacement of the actuator stem 332. As the actuator stem 332 is displaced downwardly, the valve stem 342 is displaced by a corresponding amount. In this manner, control of the positioning of the valve parts is achieved.

In order to vary the extent to which the valve stem may be displaced, and thus to vary the degree to which the valve may be opened and closed, means for making adjustments to the valve actuator 312 are provided. By adjusting the spring adjuster 336, the initial spring force may be set so that a greater or lesser downward force would be required to displace the actuator stem 332. By tightening or loosening the stem connector assembly 338, the valve stem may be moved relative to the actuator stem 332, so that positioning of the valve stem 342 resulting from displacements of the actuator stem 332 is varied.

The pressure-temperature limiter valve housing 344 comprises a lower body portion 346 and a bonnet 348 secured to the lower body portion by cap screws 350. Formed within the lower body portion 346 is a liquid flow path 352. Housed within the lower body portion 346 is a valve cage 354 provided with one or more flow ports 356. The valve cage 354 provides guidance and rigidity for a cylindrical valve plug 358 positioned within the valve cage by the valve stem 342. The valve stem 342 extends upwardly from the valve cage 354, through the bonnet 348 and, as previously indicated, it is secured to the actuator stem 332 within the valve actuator 312.

Within the bonnet 348 there is a chamber 360 for receiving a spring 362 and valve packing 364, and for defining a path for the travel of the valve stem 342. The valve packing 364 provides means for sealing fluid within the valve 310. The spring 362 provides resilience for the valve packing 364. The valve packing 364 is secured within the chamber 360 against upward forces by a packing flange 366.

In operation, the valve stem 342 is positioned to regulate fluid flow in response to displacements of the actuator stem 332. Thus, the valve plug 358 is caused to be displaced relative to the port 356 in the valve cage 354. At the fully closed position valve plug 358 rests upon valve plug seat 368.

As will be appreciated, adjustments to the adjustable parts of the actuator 312, hereinbefore described, may vary the positioning of the valve plug 358, relative to the valve seat 368 for any given air pressure applied to the diaphragm. Thus, by adjusting the spring adjuster 336, or by tightening or loosening the stem connector assembly 338, the minimum position of the valve plug 358 may be defined for the air pressure applied to the diaphragm to actuate the valve to its minimum position. For example, the minimum position may be defined as fully closed with the valve plug seated on the valve seat 368. Alternatively, the minimum position of the valve may be such that there exists some minimum flow opening between the valve plug 358 and the valve seat 368.

The pressure developed and applied to the diaphragm 320 and the diaphragm plate 322 for achieving the minimum valve position is substantially the same from operation to operation. Thus, in accordance with the foregoing discussion, the variability of the minimum positioning of the valve plug 358 is determined by the adjustments of the adjustable parts of the actuator. Therefore, on each operation of the valve, the actuator stem 332 moves downwardly by the same amount, causing the valve stem 342 to be displaced by a corresponding amount, so that the positioning of the valve plug 358 is moved to its desired minimum position in a manner functionally related to the adjustments of the spring adjuster 336 and/or the connector assembly 338. As considered elsewhere herein, the minimum valve position is adjusted to achieve dominant fuel pressure limit control by the pressure-temperature limiter valve over a limited time period during startup, i.e. preferably during ignition.

In the preferred embodiment, the valve plug 358 is electropneumatically positioned at one of two alternative positions as hereinbefore described, to provide reduced turbine temperature cycling, flame stability, fast startup, reliability by multiplicity, and other advantages.

Figure 11:
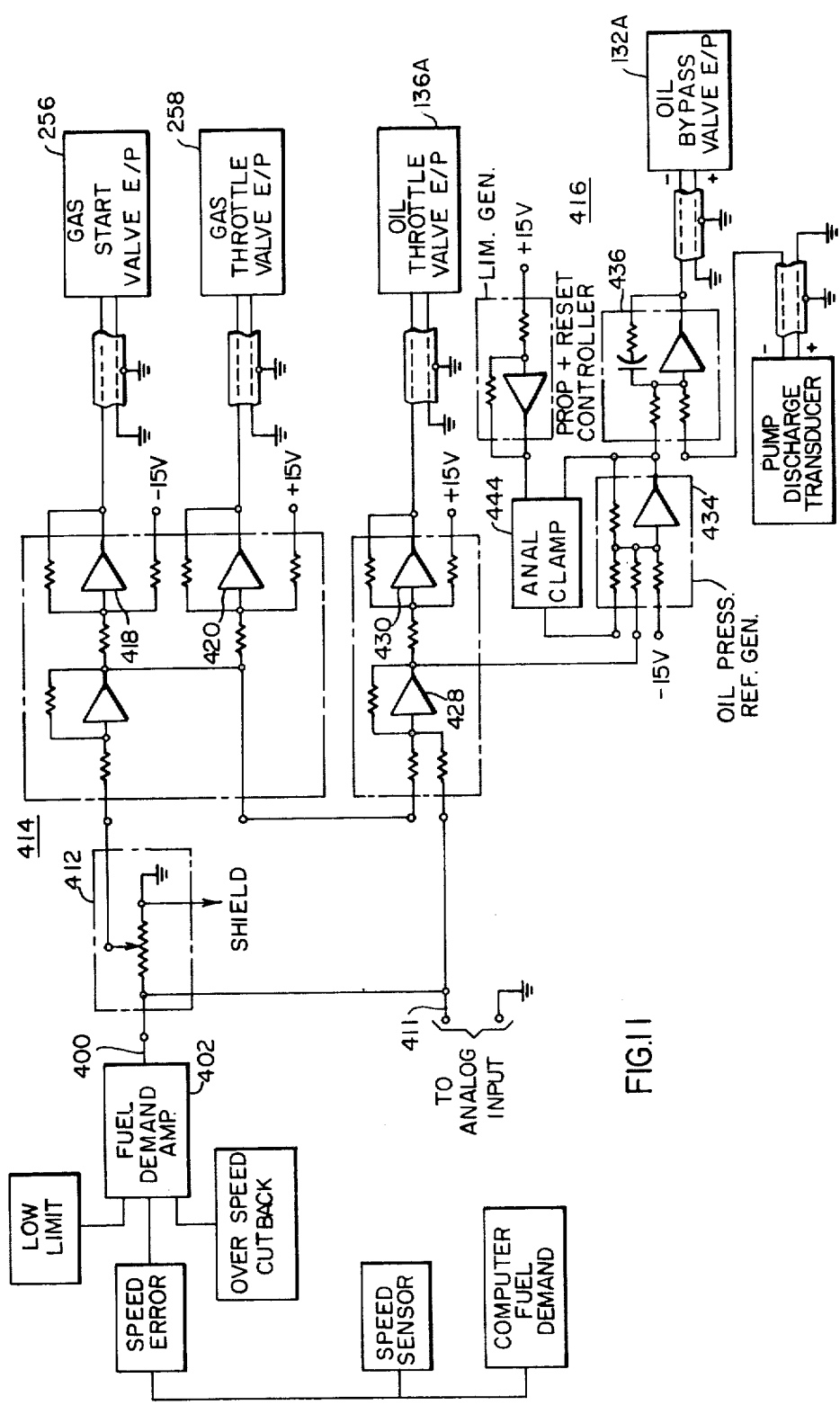
FIG. 11 shows a schematic diagram of analog circuitry associated with the computer in a particular embodiment of the control system to provide control over gas turbine fuel supply system operations.

Relevant details of the analog cage 152 are shown in FIG. 11. Thus, a sensed speed signal is compared to the computer output to develop a speed error signal. A fuel demand signal is then generated at the output of the fuel demand amplifier 402 and it is representative of the fuel needed to satisfy the computer generated speed reference, the fuel needed to satisfy a computer determined limit action, the low limit fuel demand needed to prevent flameout during normal speed operation, or to cause turbine speed cutback without flameout when overspeed conditions are detected by the auxiliary speed limiter circuit (not shown). At an input to dual fuel control circuitry, 400, the fuel demand signal (CSO) is applied across a digital potentiometer 412 which is illustrated schematically as an analog potentiometer. The fuel demand signal is also applied to a computer analog input system (not shown) for programmed computer operations as indicated by the reference character 411.

In the leftmost position of the fuel demand potentiometer 412, the fuel demand signal is fully applied to a gas fuel control 414. Under gas fuel operation, the pressure temperature limiter valve is preferably full open. In the rightmost potentiometer position, the fuel demand signal is fully applied to a liquid fuel control 416. At intermediate potentiometer positions, the total fuel demand signal is ratioed between the gas and liquid fuel controls 414 and 416 to produce the individual fuel flows which satisfy gas turbine operation demands.

The digital potentiometer position is determined by programmed computer operation of control output closures to produce the desired fuel or mixed fuel flow to nozzles in the gas turbine 100. Fuel transfer operations are also placed under automatic computer control through the digital potentiometer 412.

The gas fuel demand signal is applied to the input of a signal range adjuster amplifier 418 to produce the predetermined gain and bias characterizations for operation of the gas start valve. Similarly, the gas demand signal is applied to the input of a signal range adjuster amplifier 420 to provide predetermined gas throttle valve characterizations.

The gas fuel demand signal and the total fuel demand signal are differenced at the summing junction of an operational amplifier 428 to generate the liquid fuel demand signal. As already indicated, the liquid fuel demand signal is equal to the total demand signal when the potentiometer 412 is positioned at its rightmost position to make the gas fuel demand signal zero.

A signal range adjuster amplifier 430 operates on the liquid fuel demand signal to produce a throttle valve control signal for a liquid fuel throttle valve electropneumatic converter (FIG. 8) in accordance with the throttle valve characteristic 432 shown in FIG. 12.

At ignition, the CSO valve is 0. At this time the throttle valve 136A is set at a fixed minimum opening. In one illustrative application, the setting of the throttle valve is such as to allow 3 lbs./in$^2$ of oil pressure at the oil fuel nozzles. The oil demand signal is also applied to the input of an oil pressure reference generator 434 which generates a ramp reference for a proportional plus reset controller 436. The pump discharge pressure transducer (FIG. 8) generates a feedback signal which is summed with the ramp reference and the resultant error signal is operated upon with proportional plus reset action by the controller 436 to operate the pump pressure regulator valve electropneumatic converter (FIG. 8) in accordance with the pump discharge pressure characterization indicated by the reference character 438 in FIG. 12. When gas fuel is selected, the oil discharge pressure is regulated to a predetermined minimum value.

As shown in FIG. 12, the pump discharge pressure ramping occurs as the CSO value increases from 0 to 1.24 volts. The average elapsed time may vary, but generally it is around four minutes in the indicated illustrative application. This time is dependent on acceleration control which preferably varies in accordance with requirements for either a normal or emergency startup.

During the time interval that pump discharge pressure is being ramped, the oil throttle valve 136A is held at its fixed minimum position. Even though the CSO is increasing from 0 to 1.24 volts, the valve doesn't begin to move. The signal range adjuster amplifier 430 is biased such that no throttle valve signal is generated until the CSO signal reaches the 1.24 volt level.

When the liquid fuel demand signal reaches a value of 1.24 volts, the pump pressure ramp is terminated as indicated by the reference character 442 for higher liquid fuel demand signals. Thus, an analog clamp circuit 444 compares a limit voltage generated by a limit set point generator 446 to the oil pressure reference signal and clamps the output from the oil pressure reference generator 434 at a value which causes the pump discharge pressure to remain constant at the value indicated by the reference character 442.

After the liquid fuel signal has reached 1.24, and begins to increase from 1.24 CSO toward 5 volts CSO, the throttle valve is opened linearly as a function of CSO as shown in FIG. 12. The pump discharge pressure setpoint remains constant over this time interval.

An idle and under light loading, the throttle valve 136A is open to a position defined by the valve characteristic and the magnitude of CSO. During this time period, a basic problem of pump pressure oscillation may be attributed to a conventional pressure regulator bypass valve when it is ordinarily operating at or near the fully open position. Under this operating condition, the valve exhibits unstable operation caused by valve plug forces and referred to as buffeting. For an appreciation of this phenomenon one might refer to the paper "Valve Plug Force Effects On Pneumatic Actuator Stability" by Richard F. Lytle, Research Engineer, Fisher Controls Company, Marshalltown, Iowa, presented at an Instrument Society of America Conference, Oct. 26–Oct. 29, 1970 at Philadelphia, Pa. A unique function of the pressure-temperature limiter valve 134A at this point in the operation cycle stems from its ability to bypass additional fuel flow preferably at its minimum position, thereby causing a tendency for pump discharge pressure to drop and enabling the bypass valve 132A to be regulated under pressure setpoint control toward its closed position where it operates in a more stable operating condition.

Through the use of the pressure-temperature limiter valve 134A in this manner, the buffeting problem is substantially eliminated. Thus, fuel pressure and air temperature transients are avoided under idle and light load operations by the bypass flow arrangement.

It is preferred that the improved idle and light load operation be achieved by means of a separate bypass pressure-temperature limiter valve because (1.) such a valve is preferred for ignition operations and therefore is available in the fuel system when it is employed for ignition operations and (2.) such a valve eliminates the difficult requirements for obtaining a single bypass valve that might function optimally under each of a variety of turbine operating conditions. It is further noteworthy that the preferred minimum position operation of the pressure-temperature limiter valve at and subsequent to liquid fuel ignition initiation jointly provides a capability for reduced transient fuel pressure oscillations during ignition and idle and light load operations while permitting the retention of fast startup.

During ignition, the pump discharge fuel pressure setpoint is above the actual fuel pressure to cause the pump discharge pressure regulator valve to move to a closed position as previously indicated. Thus, the ramp output of the reference generator 434 which results from application of the computer originated fuel demand signal has a value during ignition above the actual fuel pressure which results from a combination of operating variables, i.e. principally the preset minimum pressure-temperature limiter valve position, the throttle valve position, and the speed of the turbine driven pump. Just after the ignition period, the pressure-temperature limiter valve 134A remains at its minimum position yet the actual fuel pressure rises to or above the ramp setpoint as a result of increasing pump speed and the post ignition combustion chamber conditions. Thus, the discharge regulator valve is caused to open and gain dominant control over the pump discharge pressure and the starting and loading process continues as previously described, i.e., the speed reference increases to cause an increasing throttle valve signal subject to temperature or surge limit override.

In the operation of the fuel system, the bypass fuel flow through the valves in the bypass path has been described to be controllably determinative of the behavior of the pump discharge and nozzle fuel pressures and in turn the turbine inlet air temperature. The following flow equations reflect the fuel flow relationships:

$Qp$ = Pump flow
$Qt$ = Turbine flow
$Qlv$ = Limiting valve flow
$NP$ = Pump speed
$K$ = Pump proportionality constant
$Clv$ = Limiting valve coefficient
S.G. oil = 0.86
$Plv$ = Pressure drop across limiting valve 1. $Qp = Knp$ (Pump performance function)
2. $Qp = Qlv + Qt$ Empirical ignition flow arrived at thru test
3. Calculate valve lift as follows:

$Qp = Qlv + Qt$
$Qlv = Qp - Qt$ $Clv \rightarrow \quad \leftarrow \sqrt{Plv/0.86} = Qp - Qt$ $Clv = (Qp - Qt) \rightarrow \quad \leftarrow \sqrt{0.86/Plv}$ Characteristic equations for value of oil flow $Qlv = Clv \quad \sqrt{\Delta Plv/S.G.}$ $Qlv = Clv \quad \sqrt{\Delta Plv/.86}$ Note: Valve lift is directly proportional to calculated Clv.

SUMMARY

In summary, a gas turbine electric power plant arranged in accordance with the principles of the invention is operated by a control loop arrangement with extended plant reliability and extended fuel pressure stability during ignition and other operating periods to provide improved turbine temperature operation, improved plant startup availability and extended plant life. In the preferred embodiment, a computer stored curve of desired acceleration is implemented by a speed control loop which translates the acceleration demand into speed demand and in turn into fuel demand. During startup, a surge control loop employs computer stored curves to function in response to combustor shell pressure and compressor inlet temperature and place a surge limit on the fuel demand. Similarly, a blade path temperature control loop uses a computer stored curve of combustor shell pressure verses average computed blade path temperature to place a backup limit on fuel demand. Thus, the fuel demand signal generally rises after ignition and during startup to meet a scheduled startup time under surge and exhaust temperature limits implemented through a low fuel demand selector.

With rising fuel demand, the fuel pump discharge pressure setpoint is ramped upwardly after ignition as the throttle valve opening is held fixed until a predetermined process point is reached. At that point, pump discharge pressure is held constant and increasing fuel demand causes increasing throttle valve opening.

Figure 13:
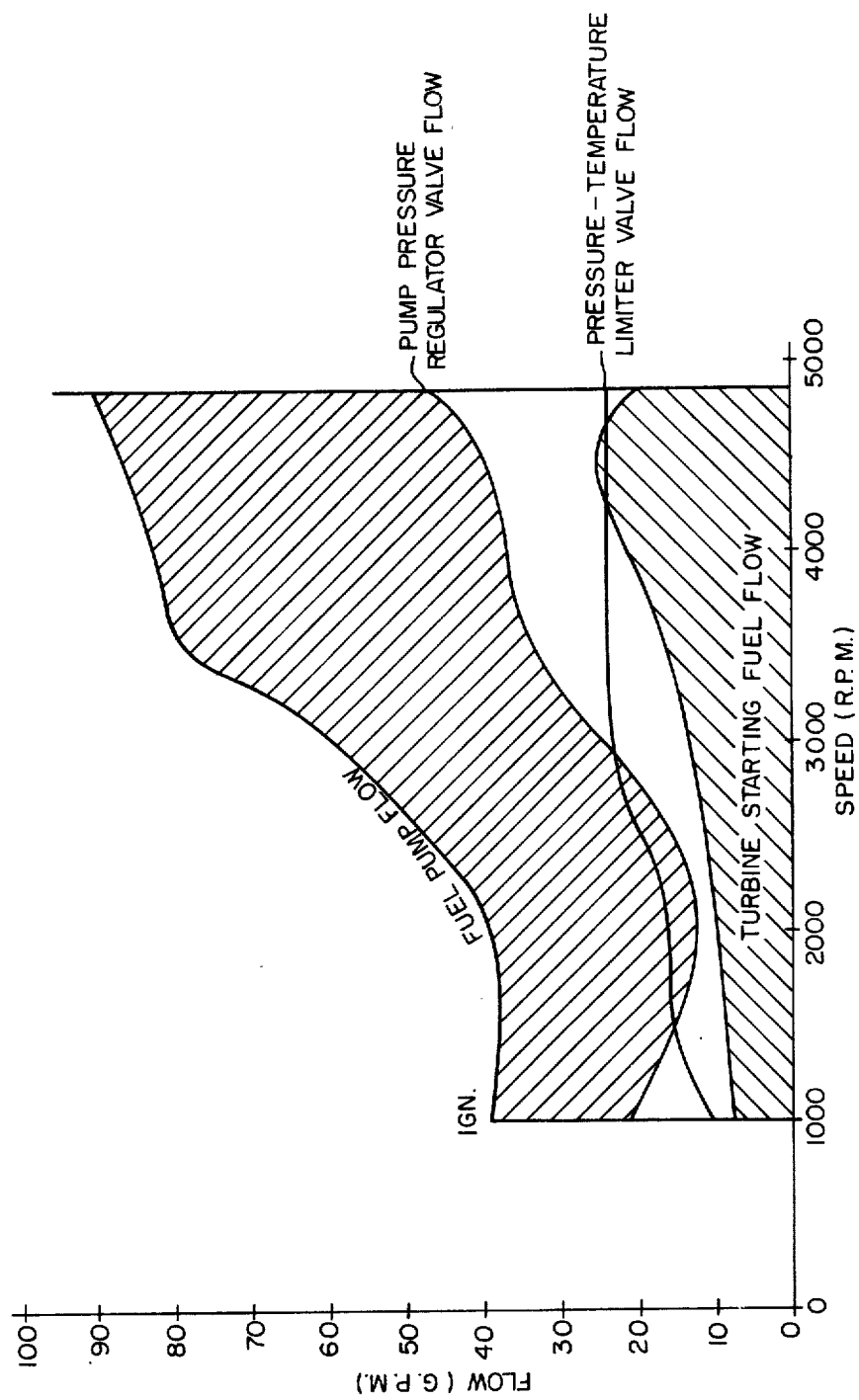
FIG. 13 illustrates curve data demonstrating liquid fuel flow in various parts of the liquid fuel supply system.

Better fuel pressure stability is obtained for nozzle fuel supplied through the throttle valve by a turbine driven pump with the employment of a bypass flow path preferably including adjustable fuel bypass flow means and a pump discharge pressure regulating bypass valve. In FIG. 13, there is shown a chart which illustrates fuel flows as a function of time thereby indicating the matter in which the bypass fuel flow interacts with the nozzle fuel flow to provide better plant performance. Thus, the total fuel flow curve is the sum of the nozzle fuel flow curve and the pressure regulator bypass fuel flow curve and the pressure-temperature limiter bypass fuel flow curve.

Preferably, the adjustable fuel bypass means is a pressure-temperature limiter valve which is set at a minimum position at ignition and which functions substantially independently of the preferred computer control during ignition. The minimum pressure-temperature limiter valve position relates to the fuel pump flow and speed characteristic to produce smooth acceleration up to an 1100°F line or a turbine speed of about 1600 rpm or 1700 rpm in about 1 minute. Thereafter, the preferred computer control system dominantly controls the turbine startup and loading process. During turbine operations, extended plant reliability by multiplicity is provided since the pressure-temperature limiter valve serves as a backup limit on fuel pressure as the preferred computer control operates as the dominant fuel pressure controller and since the control serves as a backup control on fuel pressure when the pressure-temperature limiter valve is the dominant fuel pressure limiter. Protection is provided against various control software or hardware failures including failures in the computer analog output program or the analog speed reference circuitry which would call for a high speed error and a large CSO signal and a corresponding turbine inlet error temperature overshoot.

Figure 14B:
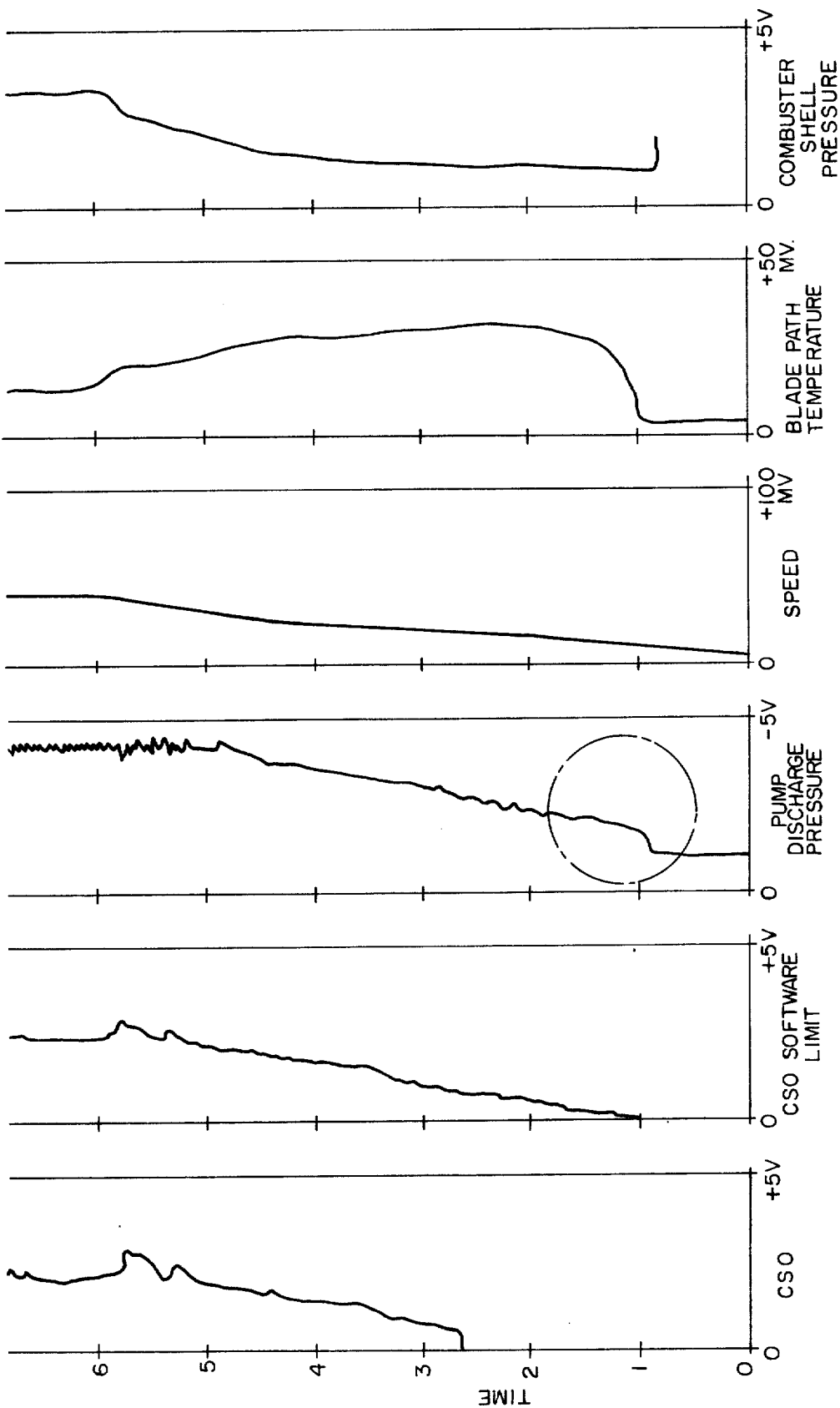

In FIGS. 14A-14F, there are shown strip recorder charts for the plant startup behavior of various plant variables. The recorder charts provide documentation of improved performance realized with application of the invention. FIG. 14A generally illustrates a prior art gas turbine startup in which undesired pump discharge pressure transient oscillations or spikes occurred as denoted by the dotted circle. The ignition and idle process points are respectively indicated on the blade path temperature and speed curves. The fuel pressure transients can cause main fuel pump damage, turbine metal damage and startup inconsistency. In turn, transient pressure overshoots or oscillations can be due to various causes such as improperly bled transducer lines, improper operation of the pump discharge bypass valve control, improper operation of the voltage to pressure transducer, or improper initial lift of the pump discharge valve. Excessive pump discharge pressure could also ordinarily result from pump discharge pressure transducer operation as a result of a loss of AC power, a blown fuse, open output wiring, miscalibration or a mechanical failure.

FIG. 14B illustrates improved gas turbine performance resulting from bypass fuel flow which is produced by a pump pressure regulating bypass valve and a two position pressure-temperature limiter valve having its minimum position adjusted to provide dominant fuel pressure limit action within the ignition period as indicated by the dotted circle. After the ignition period, the preferred computer control regulates pump discharge pressure. In this case, the dominant limit action of the pressure-temperature limiter valve lasted for 38 seconds.

Figure 14C:
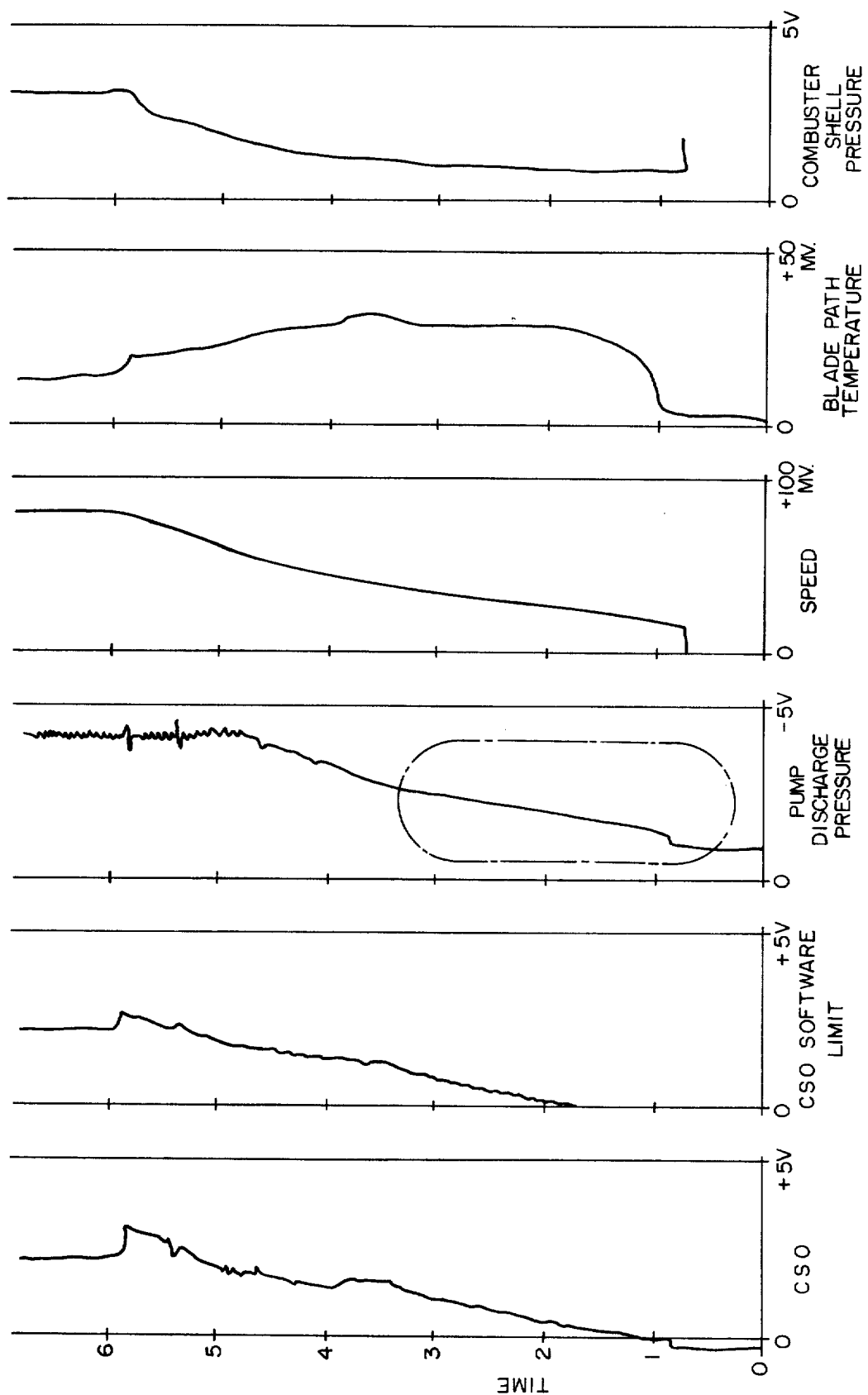
Figure 14D:
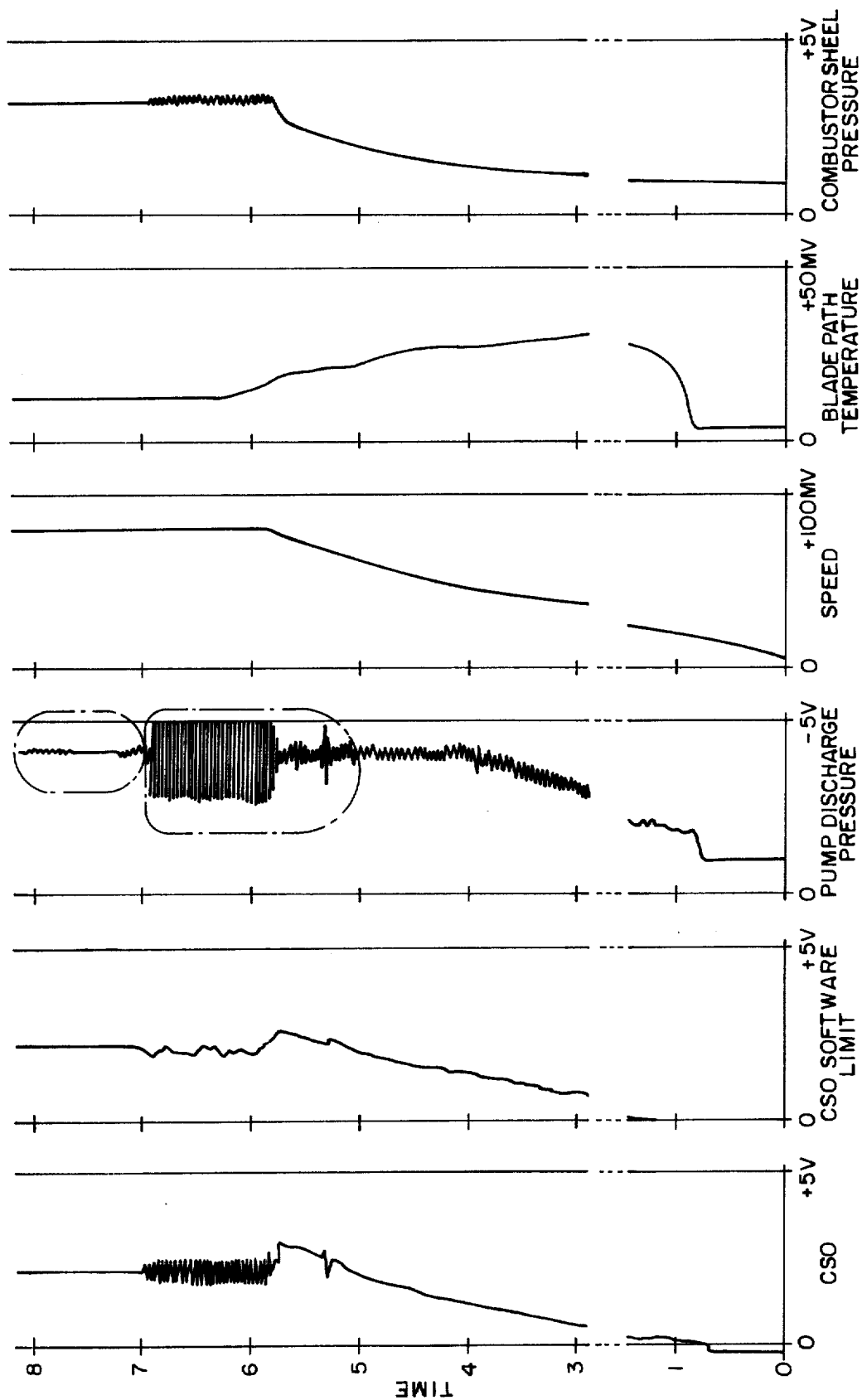

Adjustability of the pressure-temperature limiter valve is illustrated in FIG. 14C. In this case, a greater minimum pressure-temperature limiter valve opening was employed to provide limit action for 146 seconds. In FIG. 14D, wild and normally uncontrollable pump discharge pressure oscillations having a magnitude of approximately 600 PSI are shown within the lower dotted enclosure during turbine idling operation, and the relatively stable pump discharge pressure behavior which resulted from using the pressure-temperature limiter valve as described herein is shown within the upper dotted enclosure.

A comparative chart is shown in FIG. 14E. Thus, a startup pump discharge pressure curve corresponding to an extended pressure-temperature limiter valve limit action of 146 seconds is superimposed (heavy) on a conventional startup pump discharge pressurecurve. Blade path temperature rise rate is reduced and temperature overshoot is substantially eliminated as observed by comparison of the improved temperature curve (heavy) with the conventional temperature curve.

Figure 14F:
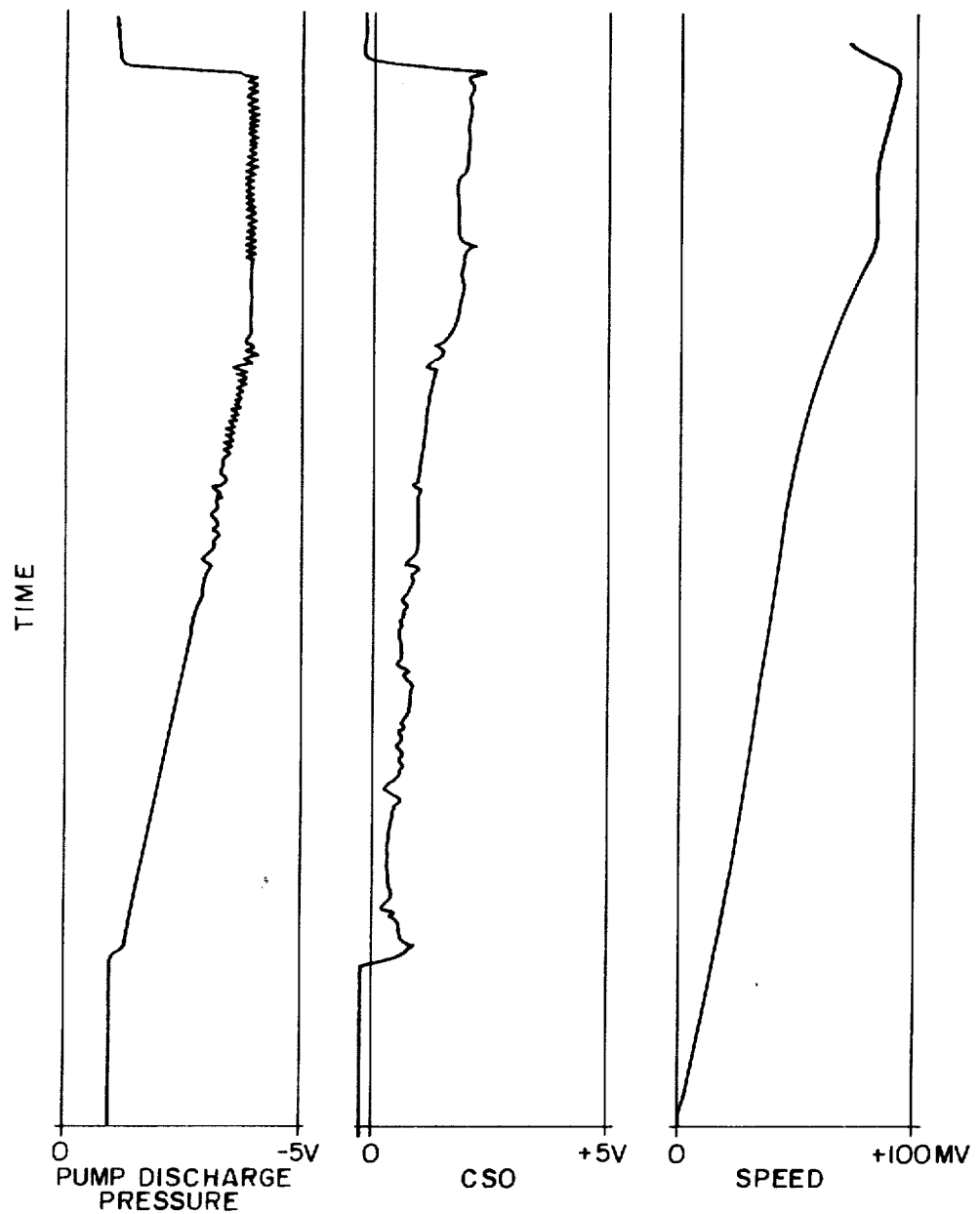

In FIG. 14F, there is illustrated a relatively large peak fuel demand CSO called for at ignition as a result of a computer malfunction. FIG. 14F further shows the protection provided against that malfunction during the ignition period by the smooth pump discharge pressure behavior resulting from bypass flow through the pressure-temperature limiter valve.

Generally, more consistent plant operation is realized with use of the invention. The turbine is reliably and efficiently protected from fuel overpressure which can otherwise occur during the critical ignition period and other periods as a result of various causes. As a further result of the interactional pressure-temperature limiter valve operation, the adverse effects of static stem force determined by fluid pressure forces and the change in momentum of the fluid beyond the valve plug as the pressure regulator bypass valve travels to its open position are eliminated by the functioning of the pressure-temperature limiter valve; accordingly, uncontrolled pressure oscillations nonresponsive to the usual modes of rate, reset and proportional control are smoothed and removed at ignition and idle or light load fuel flow conditions. It is further noteworthy that the bypass fuel flow operation described herein compensates for lack of dynamic stability of pneumatic actuators caused by valve plug forces.

At light-off, when low air flows and velocities result in poor response of the process sensors and programmed computer scanning facilities, the bypass fuel flow limit action described herein functions independently in allowing the fuel pressure to rise smoothly as a function of pump speed. Nonetheless, the preferred computer control system which is dependent upon the process sensors is available as a backup fuel pressure controller as already indicated.

In the preferred embodiment, simplicity of minimum valve position adjustment enables the fuel schedule for the critical ignition period to be established by bench setting without firing the machine. Further, the part of the startup period over which it is desired to place fuel pressure limit action by means of the pressure-temperature limiter bypass flow is readily set from turbine unit to turbine unit of production because of the relatively simple minimum position adjustability. As illustrated by the charts in FIGS. 14A-14F, adjustment of the minimum bypass flow enables adjustment of the linear ramp of temperature verses speed and airflow thereby moderating the usual initial surge of temperature and reducing cyclic thermal stress to turbine rotor parts.

We claim:

1. A gas turbine electric power plant comprising a gas turbine having compressor, combustion and turbine elements, a generator coupled to said gas turbine for drive power, a fuel system for supplying fuel to said gas turbine combustion element, said fuel system having at least a liquid fuel subsystem provided with a source of liquid fuel, a pump for pumping liquid fuel from said source to said combustion element, a throttle valve for regulating the flow of liquid fuel to said combustion element, a main flow path connecting said pump to said throttle valve and said throttle valve to said combustion element, a bypass flow path from said main flow path for controlling pump discharge pressure, means for mechanically determining a bypass flow of liquid fuel through said bypass flow path, and a control system including means for operating said liquid fuel subsystem to supply liquid fuel through said main flow path to said combustion element for turbine startup and plant loading operations, said fuel system operating means including means for regulating the pump discharge pressure, said mechanical flow determining means operating substantially independently of said control system to limit the pump discharge pressure during at least a part of the turbine operating time after initiation of ignition.

2. An electric power plant as set forth in claim 1 wherein said means for regulating the pump discharge pressure comprises second means, operably coupled to said liquid fuel system operating means, for mechanically determining a bypass flow of liquid fuel through said bypass flow path.

3. An electric power plant as set forth in claim 1 wherein said means for mechanically determining a bypass flow of liquid fuel through said bypass flow path comprises a valve in said bypass flow path.

4. An electric power plant as set forth in claim 3 wherein means are provided for actuating said valve to operate in either of two open positions.

5. An electric power plant as set forth in claim 4 and further including a gas fuel subsystem and wherein said valve is operated in the larger open position during gas fuel operation.

6. An electric power plant as set forth in claim 4 wherein said control system and said valve are arranged and operated such that said valve is the primary means for limiting pump discharge pressure during the turbine ignition period.

7. An electric power plant as set forth in claim 6 wherein said second means for mechanically determining a bypass flow of liquid fuel through said bypass flow path comprises a second valve in said bypass flow path.

8. An electric power plant as set forth in claim 7 wherein said control system and said first and second valves are arranged and operated such that said second valve is the primary means for controlling pump discharge pressure after the turbine ignition period and said first valve is a secondary means for limiting pump discharge pressure after ignition.

9. An electric power plant as set forth in claim 1 wherein said control system and said mechanical flow determining means are arranged and operated such that said mechanical flow determining means is the primary means for limiting pump discharge pressure during the turbine ignition period.

10. An electric power plant as set forth in claim 1 wherein said control system comprises a programmed digital computer and an analog subsystem.

11. Industrial gas turbine apparatus comprising a gas turbine having compressor combustion and turbine elements, a fuel system for supplying fuel to said gas turbine combustion element, said fuel system having at least a liquid fuel subsystem provided with a source of liquid fuel, a pump for pumping liquid fuel from said source to said combustion element, a throttle valve for regulating the flow of liquid fuel to said combustion element, a main flow path connecting said pump to said throttle valve and said throttle valve to said combustion element, a bypass flow path from said main flow path for controlling pump discharge pressure, means for determining a bypass flow of liquid fuel through said bypass flow path, and a control system including means for operating said liquid fuel subsystem to supply liquid fuel through said main flow path to said combustion element for turbine startup and loading operations, said fuel system operating means including means for regulating pump discharge pressure, said bypass flow determining means operating substantially independently of said control system to limit the pump discharge pressure during at least a part of the turbine operating time after initiation of ignition.

12. Industrial gas turbine apparatus as set forth in claim 11 wherein said bypass flow determining means comprises a valve in said bypass flow path.

13. Industrial gas turbine apparatus as set forth in claim 12 wherein means are provided for actuating said valve to operate in at least either of two open positions.

14. Industrial gas turbine apparatus as set forth in claim 13 wherein said valve is operated in the more open position prior to turbine ignition and in the less open position during and after ignition.

15. Industrial gas turbine apparatus as set forth in claim 12 wherein said valve is operated with a predetermined opening under idle and light load operating conditions.

16. Industrial gas turbine apparatus as set forth in claim 11 wherein said means for regulating pump discharge pressure comprises second means, operably coupled to said fuel system operating means, for mechanically determining a bypass flow of liquid fuel through said bypass flow path.

17. Industrial gas turbine apparatus as set forth in claim 16 wherein said second means for mechanically determining a bypass flow of liquid fuel through said bypass flow path comprises a second valve in said bypass flow path.

18. Industrial gas turbine apparatus as set forth in claim 17 wherein said control system and said first and second valves are arranged and operated such that said second valve is the primary means for controlling pump discharge pressure after the turbine ignition period and said first valve is the primary means for limiting pump discharge pressure during the turbine ignition period and a secondary means for limiting pump discharge pressure after the ignition period.

19. Industrial gas turbine apparatus as set forth in claim 16 wherein said control system comprises a programmed digital computer and an analog subsystem.

20. Industrial gas turbine apparatus as set forth in claim 19 wherein said analog subsystem further comprises a control circuit responsive to outputs from said computer, said control circuit being coupled to said second valve for controlling or limiting fuel pressure in said liquid fuel subsystem.

21. Industrial gas turbine apparatus as set forth in claim 19 wherein said control system includes means for determining throttle valve position, said throttle valve determining means including a second control circuit in said analog subsystem for operating said throttle valve.

22. Industrial gas turbine apparatus as set forth in claim 14 wherein said valve is operated with a predetermined opening under idle and light load operating conditions.

23. Industrial gas turbine apparatus as set forth in claim 14 wherein said means for regulating pump discharge pressure comprises a second valve in said bypass flow path operably coupled to said fuel system operating means, and wherein said control system and said first and second valves are adapted such that said second valve is the primary means for controlling pump discharge pressure after turbine ignition, and said first valve is the primary means for limiting pump discharge pressure during the turbine ignition period, and a secondary means for limiting pump discharge pressure after ignition.

24. A control system for operating a gas turbine electric power plant including a gas turbine having compressor, combustion and turbine elements and a fuel system for supplying fuel to said combustion element, said fuel system having at least a liquid fuel subsystem provided with a source of liquid fuel, a pump for pumping liquid fuel from said source to said combustion element, a throttle valve for regulating the flow of liquid fuel to said combustion element, a main flow path connecting said pump to said throttle valve and said throttle valve to said combustion element, and a bypass flow path from said main flow path for limiting pump discharge pressure, said control system comprising means for mechanically determining a bypass flow of liquid fuel through said bypass flow path, means for operating said liquid fuel subsystem to supply liquid fuel through said main flow path to said combustion element for turbine startup and plant loading operation, said fuel system operating means including means for regulating pump discharge pressure, said mechanical flow determining means operating substantially independently of said control system to limit pump discharge pressure during at least a part of the turbine operating time after initiation of ignition.

25. a control system as set forth in claim 24 wherein said liquid fuel subsystem operating means includes a programmed digital computer and an analog subsystem.

26. A control system as set forth in claim 24 wherein said bypass flow determining means comprises a valve in said bypass flow path and means for actuating said valve to operate in at least either of two open positions and wherein said valve is operated in the more open position prior to turbine ignition and in the less open position during and after ignition.

27. A control system as set forth in claim 26 wherein said liquid fuel subsystem operating means includes a programmed digital computer and an analog subsystem.

28. A control system as set forth in claim 27 wherein means are provided for sensing at least one predetermined plant condition so as to generate a computer output for triggering movement of said bypass valve from its larger position to its smaller position substantially as ignition is initiated.

29. A control system as set forth in claim 25 wherein said bypass flow determining means comprises a first valve in said bypass flow path and means for actuating said valve to operate in at least either of two open positions, said means for regulating pump discharge pressure comprising a second valve operably coupled to said fuel system operating means for mechanically determining a bypass flow fo liquid fuel through said bypass flow path, and wherein said control system and said first and second valves are arranged and operated such that said second valve is the primary means for controlling pump discharge pressure after the turbine ignition period and said first valve is the primary means for limiting pump discharge pressure during the turbine ignition period and a secondary means for limiting pump discharge pressure after the ignition period.

30. A control system as set forth in claim 25 wherein means are provided for operating said computer to determine the operating position of said first mechanical means over substantially all phases of gas turbine operation.

31. A control system as set forth in claim 25 wherein means are provided for operating said computer to determine the times for positioning said second mechanical means in either of two predetermined alternative open positions.

32. A control system as set forth in claim 25 wherein said pressure discharge regulating means includes a regulating valve in said bypass flow path and said control system further comprises a control circuit in said analog subsystem responsive to outputs from said computer, said control circuit coupled to said regulating valve for controlling fuel pressure in said liquid fuel subsystem during predetermined turbine operating time periods.

33. A control system as set forth in claim 32 wherein said control system further includes means for determining throttle valve position, said throttle valve determining means including a second control circuit in said analog subsystem for operating said throttle valve.

34. A fuel system for supplying fuel to an industrial gas turbine combustion element, said fuel system having at least a liquid fuel subsystem provided with a source of liquid fuel, a pump for pumping liquid fuel from said source to said combustion element, a throttle valve for regulating the flow of liquid fuel to said combustion element, a main flow path connecting said pump to said throttle valve and said throttle valve to said combustion element, a bypass flow path from said main path for controlling pump discharge pressure, means for mechanically determining a bypass flow of liquid fuel through said bypass flow path, and a control system including means for operating said liquid fuel subsystem to supply liquid fuel through said main flow path to said combustion element for turbine startup and loading operations, said fuel system operating means including means for regulating the pump discharge pressure, said mechanical flow determining means operating substantially independently of said control system to limit the pump discharge pressure during at least a part of the turbine operating time after initiation of ignition.

* * * * *